US008676635B2

(12) United States Patent
Giacomello

(10) Patent No.: US 8,676,635 B2
(45) Date of Patent: *Mar. 18, 2014

(54) METHOD AND SYSTEM FOR MANAGING TRANSACTIONS

(75) Inventor: Mauro Antonio Giacomello, Milan (IT)

(73) Assignee: International Business Machines Corporation, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 12/351,067

(22) Filed: Jan. 9, 2009

(65) Prior Publication Data

US 2009/0119146 A1 May 7, 2009

Related U.S. Application Data

(63) Continuation of application No. 10/527,035, filed as application No. PCT/EP03/10082 on Aug. 13, 2003, now Pat. No. 7,477,953.

(30) Foreign Application Priority Data

Sep. 12, 2002 (EP) .................................... 02368099

(51) Int. Cl.
*G06Q 10/00* (2012.01)
(52) U.S. Cl.
USPC ........ 705/8; 700/90; 700/9; 700/71; 718/101; 705/10; 705/43
(58) Field of Classification Search
USPC ............ 700/90, 9, 71; 718/101; 705/8, 10, 43
See application file for complete search history.

(56) References Cited

U.S. PATENT DOCUMENTS

| 5,095,421 A | 3/1992 | Freund |
| 5,363,121 A | 11/1994 | Freund |
| 5,428,771 A | 6/1995 | Daniels et al. |
| 5,561,797 A | 10/1996 | Gilles et al. |
| 5,764,897 A | 6/1998 | Khalidi |
| 5,768,587 A | 6/1998 | Freund et al. |
| 6,094,688 A | 7/2000 | Mellen-Garnett et al. |

FOREIGN PATENT DOCUMENTS

EP 0969363 A2 1/2000

OTHER PUBLICATIONS

Notice of Allowance (Mail Date Aug. 25, 2008) and Supplemental Notice of Allowability (Mail Date Nov. 25, 2008) for U.S. Appl. No. 10/527,035, Filed Mar. 8, 2005; Confirmation No. 5566.

*Primary Examiner* — Tejal Gami
(74) *Attorney, Agent, or Firm* — Schmeiser, Olsen & Watts, LLP; John Pivnichny

(57) ABSTRACT

A method and system for managing transactions. At least one resource manager (RM) for managing changes to respective system resources of a data processing system is provided. A resource manager coordinator (RMC) for coordinating commit-backout activities of the at least one resource manager is provided. The resource manager coordinator (RMC) is hosted by the data processing system. The data processing system receives a business service request from a remote computer system to perform a task. The task includes compliant processes complying with a commit/backout protocol and non-compliant processes not complying with a commit/backout protocol. The compliant processes are running on the data processing system and the non-compliant processes are running on a counterpart processing system that is coupled to the data processing system by a labile link.

14 Claims, 7 Drawing Sheets

| BRID/CLID | BRCLS | ASS CMP | STUP STAT | IN-FLGT STAT | C-SYS | SUB C-SYS | HEADER | TRAILER | ASS BR | XBR/XOBR | USAUT/ACC | OTHER INFO | MSG FRMT |
|---|---|---|---|---|---|---|---|---|---|---|---|---|---|
| A | NPCBR | | ON | ON | | | E | F | G,H | J | | | |
| B | NPCBR | | OFF | ON | | | | | P | | | | |
| C | | | ON | OFF | | | | | | | | | |
| G | OBR | | OFF | ON | C-SYS1 | BUY | | | | | | | |
| H | OBR | | OFF | ON | C-SYS1 | | | | | | | | |
| I | OBR | | OFF | ON | | BUY | | | | | | | |
| K | OBR | | OFF | ON | | | | | | | | | |
| D | | | OFF | OFF | | | | | | | | | |
| P | NPCBR | PGh/TRk | ON | ON | | | | | L,M | | | | |
| J | XBR | | | | | | | | | | | | |
| L | XOBR | | | | | | | | | | | | |
| M | XOBR | | | | | | | | | | | | |
| Z | XBR | | | | | | | | | | | | |
| DEF | | | | | | | | | | | | | |
| NPCBR | NPCBR | | ON | ON | | | | | | Z | | | |
| NCBR | NCBR | | ON | ON | | | | | | Z | | | |
| OVRD | | | | | | | | | | | | | |
| NPCBR | NPCBR | | | | | | | | | | JSMITH | | ASCII COBOL copybook |

FIG. 4

| C-SYS | SUB C-SYS | ASS CMP | C-SYS ST-UP STAT | C-SYS IN-FLGT STAT | CNCT ID | CNCT ATTR | SIGN ON | IN DOUBT | BACK OUT | VER | SYS REC MODE | TO | USAUT/ ACC | MSG FRMT |
|---|---|---|---|---|---|---|---|---|---|---|---|---|---|---|
| C-SYS1 | BUY | | ON | ON | Cntc2 | RPC CSYS11 pool2 Other Attributes | | DEFRPC | DEF | | DEF | | | |
| C-SYS1 | SEL | | OFF | ON | Cntc2 | RPC CSYS12 pool2 Other Attributes | | DEFRPC | DEF | | DEF | | | |
| C-SYS1 | | | ON | OFF | Cntc2 | MSG CSYS11 pool3 Other Attributes | | DEFMSG | DEF | | DEF | | | |
| C-SYS2 | | RMPGp RMTRq | OFF | OFF | Cnct1 | RPC CSYS21 pool1 Other attributes | PR1 | DEFRPC | DEF | PR4 | ASYS, SSYS | 50 | JSMITH | |

FIG. 5

METHOD AND SYSTEM FOR MANAGING TRANSACTIONS

This application is a continuation application claiming priority to Ser. No. 10/527,035, filed Mar. 8, 2005.

TECHNICAL FIELD

The present invention relates generally to data processing systems, and more specifically to data processing systems in which processes running in the system need to be coordinated according to a commit/backout protocol, such as transaction processing systems. In particular, the invention concerns a data processing system adapted to integrating non-homogeneous processes, i.e., processes compliant to a commit/backout protocol and processes non compliant to such a protocol.

BACKGROUND ART

Introducing new applications (such as programs, transactions, classes, objects or methods) in an existing data processing environment poses several problems. Due to the rapid technological evolution, the new applications are normally based on different architectures compared to the existing applications; making the new applications capable of interacting with the existing ones can be a real challenge.

This problem is nowadays particularly felt, because a breed of new Internet-based services, for example for implementing e-business functions, is introduced. These new services need to interact with existing business functions within a company data processing system, such as legacy applications.

Similar problems may be encountered when already existing components need to collaborate to implement a new service.

In order to integrate a new application within a framework of existing, heterogeneous applications, or to make existing heterogeneous applications interact to achieve a new function, several critical factors, both technical and applicative, need to be considered. Multiple different skills in the field of information technology are involved, with a consequent increase in costs and time.

Four possible methodologies can be identified.

A first approach tries to maximally exploit the existing processes; in order to enable a new process to interact with an existing process, an interface layer is created capable of interpreting and properly translating requests from a business process into services and related coherence controls. Investements made for developing the already existing applications are in this way preserved.

According to a second approach, redundant functions are developed. The functions necessary for carrying out a new business process, albeit already present in the existing environment, are replicated in the new environment. The result is duplication of functions and data, causing increased development and management time and costs. Additionally, problems of reconciliation of the duplicated data may arise.

Following a third approach, the already existing functions are modified to adapt to the requirements of the new business process to be implemented. This involves a highly accurate knowledge of the existing functions and environment, and the availability of professional skills which may be not readily available. Consequently, the costs can be very high.

Finally, a fourth approach provides for developing a new application including both the new business processes and the business processes already in production. Apart from the costs, a rather long time may be required to put the new processes into production, with a negative impact on a company core business.

SUMMARY OF THE INVENTION

In view of the state of the art outlined in the foregoing, it has been an object of the present invention to provide a data processing system capable of supporting etherogeneous applications.

According to the present invention, this and other objects have been attained by means of a data processing system as set forth in appended claim 1.

Briefly stated, the data processing system comprises at least one resource manager for managing changes to respective system resources in accordance to a commit/backout protocol, and a resource manager coordinator for coordinating the commit/backout activities of the at least one resource manager.

A process resource manager is provided for, coordinated by the resource manager coordinator according to the commit/backout protocol, for managing the execution of non-compliant processes not complying with the commit/backout protocol. Upon receipt of a backout request, the process resource manager automatically determines a sequence of compensation actions to be performed to backout actions performed during the execution of the non-compliant processes.

BRIEF DESCRIPTION OF THE DRAWINGS

The features and advantages of the present invention will be made apparent by the following detailed description of an embodiment thereof, provided merely by way of a non-limiting example, which will be made with reference to the attached drawings, wherein:

FIG. 4 schematically shows a business request catalog held by a business request cataloging service provided by the service provider subsystem;

FIG. 5 schematically shows a counterpart system directory held by a directory service provided by the service provider subsystem;

DETAILED DESCRIPTION OF THE PREFERRED EMBODIMENT

Figure 1:
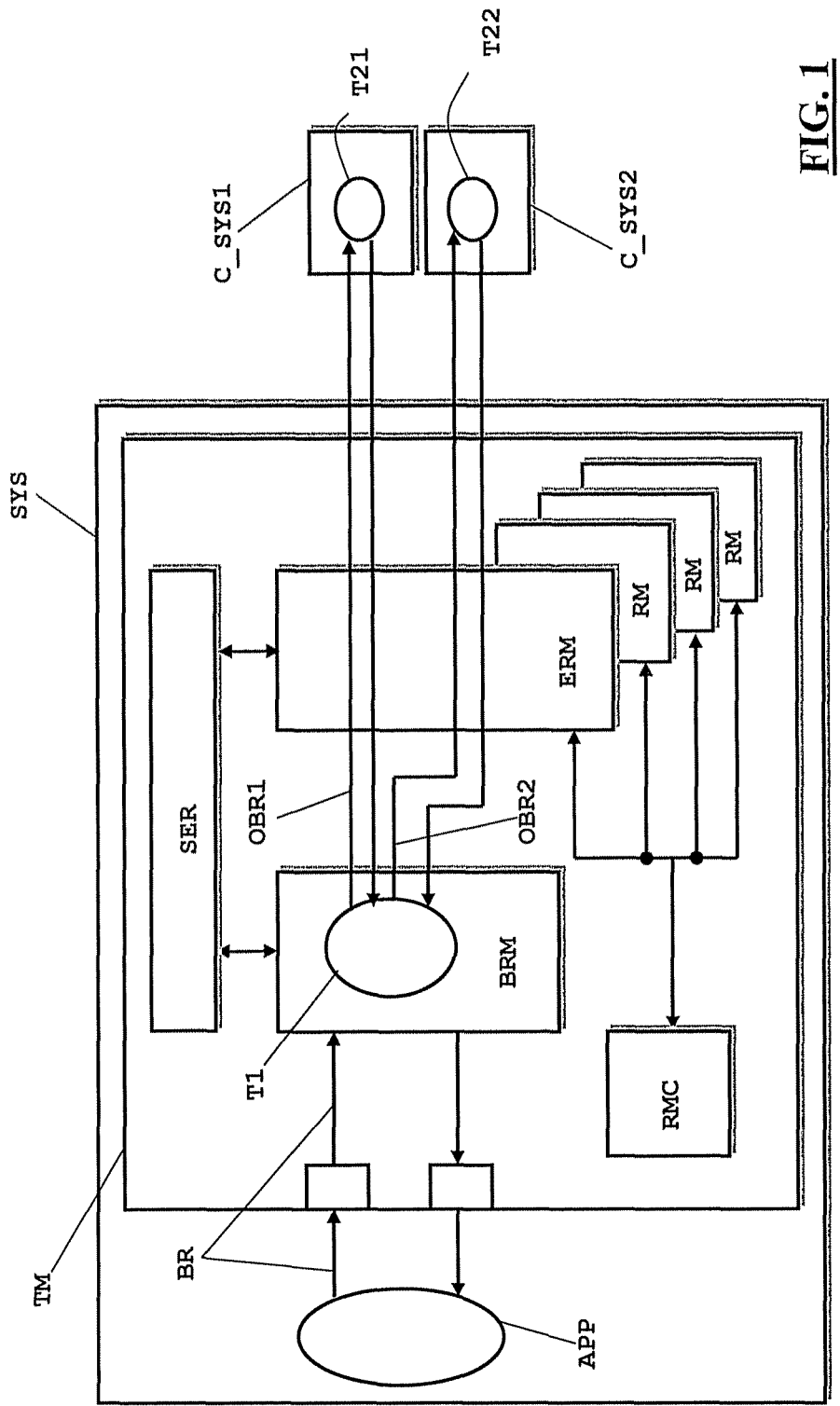
FIG. 1 is a schematic block diagram of the main components of a transaction management system according to an embodiment of the present invention.

Referring to the drawings, FIG. 1 schematically shows, in terms of functional blocks, the main components of a transaction processing system according to an embodiment of the present invention.

The transaction processing system comprises a data processing system SYS, hosting a transaction manager system TM, in the following shortly referred to as transaction manager.

The transaction manager TM manages business service requests BR (in the following referred to as business requests) issued by applications running either locally to the data processing system SYS that hosts the transaction manager TM, such as the application APP in the shown example, or in a remote data processing system, for example on a client computer connected to an enterprise's data processing system over the Internet. By way of example, the data processing system SYS is a front-end server of a bank agency, receiving business service requests by a bank ATM.

The data processing system SYS is connected to one or more distinct data processing systems, such as the two data processing systems C_SYS1 and C_SYS2 shown in the drawing, in the following referred to as counterpart systems. The data processing system SYS can interact with the counterpart systems C_SYS1, C_SYS2 for servicing the business requests. The system SYS and the counterpart systems C_SYS1, C_SYS2 may be connected over a LAN, a sysplex, a cluster, a WAN, the Internet. The system SYS and the counterpart systems C_SYS1, C_SYS2 may form a local set of data processing systems, such as a sysplex or a cluster, and the local set of systems may be connected to one or more geographically remote data processing systems or set of systems. Reverting to the previously cited example, the system SYS (front-end bank agency server) is connected to a bank agency main server, which is in turn connected to a network of other main servers in different bank agencies.

The data processing system SYS hosts a resource manager coordinator RMC, controlling and coordinating the activity of a plurality of resource managers RM. Each resource manager is in charge of managing respective system resources (not shown in the drawing), such as databases, archives, data tables, files, data records and the like. Each resource manager RM manages changes to the respective resources, requested by a generic task running under the control of the transaction manager TM.

A feature of a transaction processing system, called atomicity, is that access and updates to system resources are typically carried out by the execution of discrete transactions, also referred to as units of work (hereinafter, UOWs). A UOW is a sequence of coordinated operations on system resources such that either all of the changes take effect or none of them does. These operations are typically changes made to data held in storage in the transaction processing system. In this way, system resources are prevented from being made inconsistent to each other. If one of the set of update operations fails then the others must also not take effect. A UOW then transforms a consistent state of system resources into another consistent state, without necessarily preserving consistency at all intermediate steps.

The atomic nature of the transactions is maintained by means of a transaction synchronization procedure commonly called commit procedure. Logical points of consistency at which resource changes are synchronised within the transaction execution are called commit points; a UOW is closed by the task declaring a commit upon reaching a commit point, or when the task terminates.

Atomicity of a transaction is achieved by resource updates made within the transaction being held in doubt (uncommitted) until a commit is declared upon completion of the transaction. If the transaction succeeds, the results of the transaction are made permanent (committed); if the transaction fails, all effects of the unsuccessful transaction are rejected (backed out or rolled back). That is, the resource updates are made permanent and visible to tasks other than the one under which the resource updates were carried out only upon successful completion; for the duration of each unit of work, all updated resources must then be locked to prevent further update access. On the contrary, when a transaction backs out, the resources are restored to the consistent state existing before the transaction began.

The changes requested by a task to the system resources managed by a generic resource manager RM are managed by that resource manager in such a way as to allow a postponed commit thereof, depending on the outcome of the task, upon receival of a commit request by the resource manager coordinator RMC, under a single- or two-phase commit protocol. The consolidation or the rejection of the changes to system resources can be triggered explicitly by a commit or backout command, or implicitly by the successful or unsuccessful termination of the task. The resource manager coordinator RMC receives the explicit commit or backout command, or an indication of the successful or unsuccessful termination of the task, and propagates a commit or backout request to the resource managers RM responsible of managing the system resources involved in the changes.

The transaction manager TM includes a business request manager subsystem BRM, an extended resource manager subsystem ERM and a service provider subsystem SER, providing services to both the business request manager subsystem BRM and the extended resource manager subsystem ERM.

The business request manager BRM is activated by the transaction manager TM whenever a business request BR is received. The transaction manager TM detects the incoming business request and activates the business request manager BRM. The incoming business request BR is managed by the business request manager BRM as a service request directed to a generic transaction or application; the service request is processed by a task T1, involving one or more UOWs.

As will be explained in detail hereinbelow, the business request manager BRM, activated by the transaction manager TM upon launching of the task T1, started for processing the business request BR, exploits services provided by the service provider subsystem SER for controlling the task execution.

In particular, the business request manager BRM implements a business request classification scheme and exploits different services provided by the service provider SER depending on the business request class to which the incoming business request BR belongs.

In general, depending on the business process flow, during the execution of the task T1 launched for processing the incoming business request BR, one or more service requests may be generated that are directed to different programs or transactions, operating either in the same system SYS hosting the transaction manager TM, or in one or more of the counterpart systems C_SYS1, C_SYS2, such as the service requests OBR1 and OBR2 shown in FIG. 1 and hereinafter referred to as outbound business requests or, shortly, OBRs. These service requests, which are treated similarly to incoming business requests BR, cause tasks T21, T22 to be launched within the respective counterpart systems C_SYS1, C_SYS2 to which the OBRs are directed, and are managed by the extended resource manager ERM.

It is observed that, in the context of the present description, an OBR is not only a business request issued in respect of a counterpart system of the system SYS, but also a business request issued in respect of a component, e.g. an application, of the system SYS but featuring a weak link, i.e., a component that cannot be subjected to a commit/backout protocol.

Interfacing processes not complying with commit protocols, i.e., processes whose UOWs are not homogeneously coordinated during the backout phase by a resource manager coordinator, makes it necessary to manage a compensation activity (implicit or explicit) directed to making the system converge towards a coherent state determined dynamically. This is triggered by malfunctionings or explicit backout requests, and is managed by the extended resource manager ERM by the explicit activation of compensation components (XBRs and/or XOBRs, described in detail later on), or by retrieving what previously recorded by a log service provided by the service provider subsystem SER. The information necessary to the compensation activity is determined dynamically, on the basis of the information recorded by the log service during the preceding elaboration phases (possibly including previous compensation attempts).

In particular, the extended resource manager ERM is seen by the transaction manager TM as one of the resource managers RM. The transaction manager TM activates the extended resource manager ERM each time an OBR, e.g. the OBRs OBR1, OBR2, is issued; as will be explained later on, an OBR may explicitly invoke the extended resource manager ERM, or the latter may be invoked implicitly. Briefly stated, the extended resource manager ERM supervises the execution of the OBRs and guarantees that they are correctly executed even in case of anomalies, such as in case of in-doubt situations possibly arising during the execution of the UOWs involved in the processing of the OBRs. From the viewpoint of the resource manager coordinator RMC, the extended resource manager ERM manages the OBRs, and the processes running on counterpart systems for servicing the OBRs, in a way similar to that the resource managers RM manage the respective system resources, enabling the implementation of a single- or two-phase commit/backout protocol of the processes running on the counterpart systems.

In particular, the extended resource manager ERM identifies, activates and monitors the secondary processes (in the example, the tasks T21 and T22) invoked by the primary process (T1) and activated by the business request manager BRM. While the changes made to the system resources managed by the resource managers RM can be backed out and the system resources brought back to the state in which they were before such changes were applied, this is in general not possible for the changes caused by the secondary processes. Problems of communication protocol between the system SYS and the counterpart systems, behaviour of the latter and the like, which in this context will be globally referred to as problems of labile link, may make it impossible to revert the counterpart systems to the state in which they were before the secondary processes were launched. In general, instead of a true backout, the extended resource manager ERM manages a compensation activity of the changes made by the secondary processes.

During the life cycle of a generic task, several UOWs can be sequentially instantiated, and be committed or backed out. Each UOW is identified by a univocal identification code (UOWID), used for managing the UOW. The commit or backout of a UOW causes the automatic end of the UOW under execution and makes it possible to instantiate a new UOW, if required by the business logic.

Figure 2A:
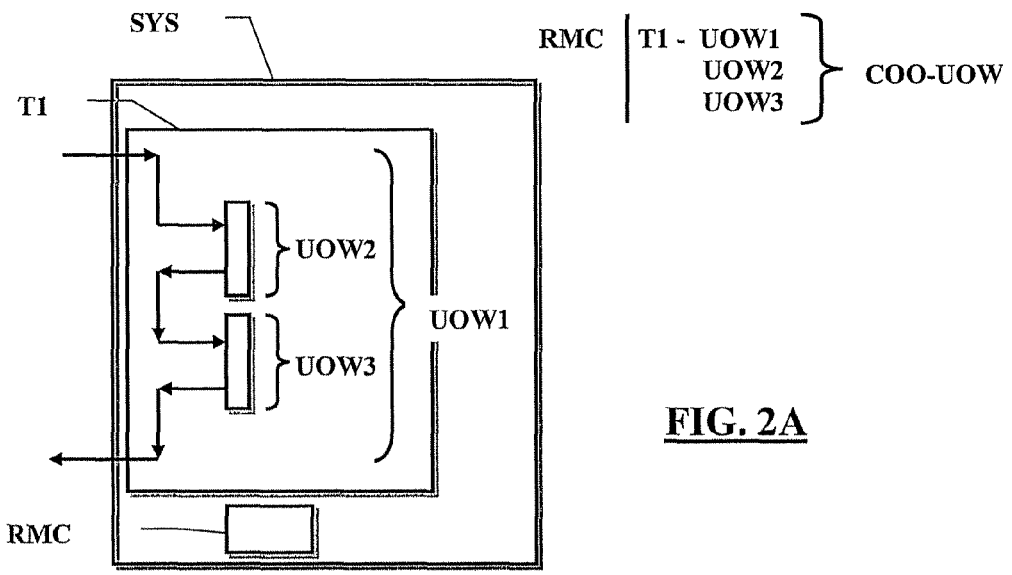
FIGS. 2A and 2B schematically show the managing of unit of works by a resource manager coordinator of the transaction management system of FIG. 1.

During the execution of the task T1, changes to system resources managed by different resource managers RM may be requested. In this case, a plurality of correlated UOWs are simultaneously instantiated; all these correlated UOWs are subordinated to a main UOW, which in the following will be referred to as coordination UOW (COO-UOW), managed by the resource manager coordinator RMC. This situation is schematically shown in FIG. 2A, wherein the UOWs UOW1, UOW2 and UOW3 are correlated and managed by the resource manager coordinator RMC as a coordination UOW COO-UOW.

Similarly, during the execution of the task T1 (main task) correlated tasks T21, T22 (secondary tasks) can be launched on different counterpart systems C_SYS1, C_SYS2; several UOWs potentially correlated to each other are thus simultaneously logically associated with the main task T1; also in this case, all these UOWs are subordinated to a COO-UOW, managed by the resource manager coordinator RMC. This situation is schematically depicted in FIG. 2B.

Figure 2B:
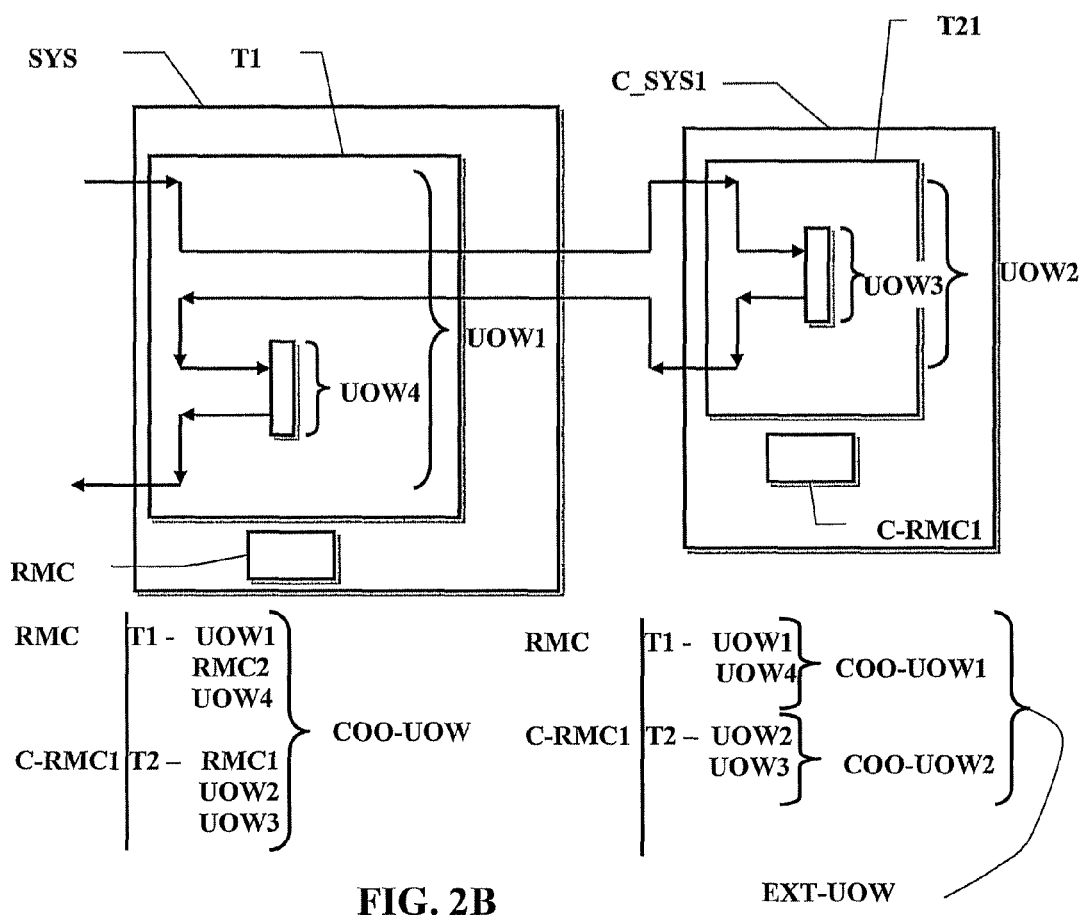

In this second case, and provided that the links between the system SYS and the counterpart systems are strong (i.e., not labile, enabling the implementation of a commit/backout protocol), the resource managers in the counterpart systems, such as the resource manager C-RMC1 in the counterpart system C_SYS1 shown in FIG. 2B, may be coordinated by the resource manager coordinator RMC of the system SYS, or they can be coordinated by the local resource manager coordinators, in turn coordinated by the resource manager coordinator RMC in the system SYS. In any case, all the instantiated UOWs are subordinated to a unique COO-UOW.

If instead the links between the system SYS and the counterpart systems are labile, several COO-UOWs will be set up, each one managed by a respective resource manager coordinator, which are not coordinated to each other. Such COO-UOWs, for example the COO-UOWs COO-UOW1 and COO-UOW2 in FIG. 2B, are handled by the extended resource manager ERM as an extended UOW EXT-UOW, in the following referred to as EXT-UOW.

Normally, the changes to the data requested by each task, grouped as UOWs, are managed by the resource managers RM, coordinated by the resource manager coordinator RMC, so as to allow more tasks simultaneously acting on shared archives. The changes requested by a generic task are rendered public and available to the other tasks only after the commit of the associated UOW; if the UOW is backed out, the changes are not consolidated and the data in the archives are rendered public to the other tasks in an unaltered form. In this way, it is guaranteed that the different tasks access coherent data, not subjected to partial changes by other tasks. The capability of the transaction processing system of managing logically coherent groups of data exploited by programs or transactions is referred to as referential integrity.

The UOWs coordinated by a COO-UOW may however include both UOWs complying to a commit/backout protocol (compliant UOWs), and UOWs (so-called non-compliant UOWs) that, due to the nature of the processes or resources involved, do not support a commit/backout protocol. The COO-UOW is in this case referred to as extended UOW (EXT-UOW).

Differently from the case of a COO-UOW made up by compliant UOWs, in the case of an EXT-UOW the presence of non-compliant UOWs prevents the normal data integrity scheme from being ensured, at least for that part of changes occurring within non-compliant UOWs. The consolidation of those changes to the system resources made during the execution of the compliant UOWs is postponed and subordinated to the outcome of the main task; the remaining changes to the system resources made during the execution of the non-compliant UOWs can be consolidated either contextually to their execution or at the end of the associated secondary task. The successful completion of the main task associated with an EXT-UOW does not pose problems, because all the changes are confirmed: the changes made within compliant UOWs are confirmed, the changes made within non-compliant UOWs, already consolidated, need not be backed out. Differently, a possible backout request (either applicative or infrastructural) produces a misalignment in the resources involved: the changes yet uncommitted can be and are backed out, while the changes already consolidated because not subjected to a commit protocol cannot be and are not backed out. In this case, the state of the whole system (the system SYS and the counterpart systems C_SYS1, C_SYS2) cannot be brought back to the state before the changes were made; a specific compensation activity needs to be carried out, directed to making the whole system converge towards a coherent state determined dynamically, because the system cannot be brought back to the initial state.

This involves two levels of exposition of the system. A first level of exposition is generated in case of commit of the changes brought within the compliant UOWs, due to the different timing by which the changed data are rendered public to different tasks. A second level of exposition is generated in consequence of a backout of the changes brought by a task, and is due to the difference by which the system services the backout request: the changes made within compliant UOWs are backed out immediately, while the changes made within non-compliant UOWs are compensated, and the compensation may even be postponed. A temporary misalignment may occur of logically-correlated data which are rendered public at different times and in a non-definitive form.

Figure 3:
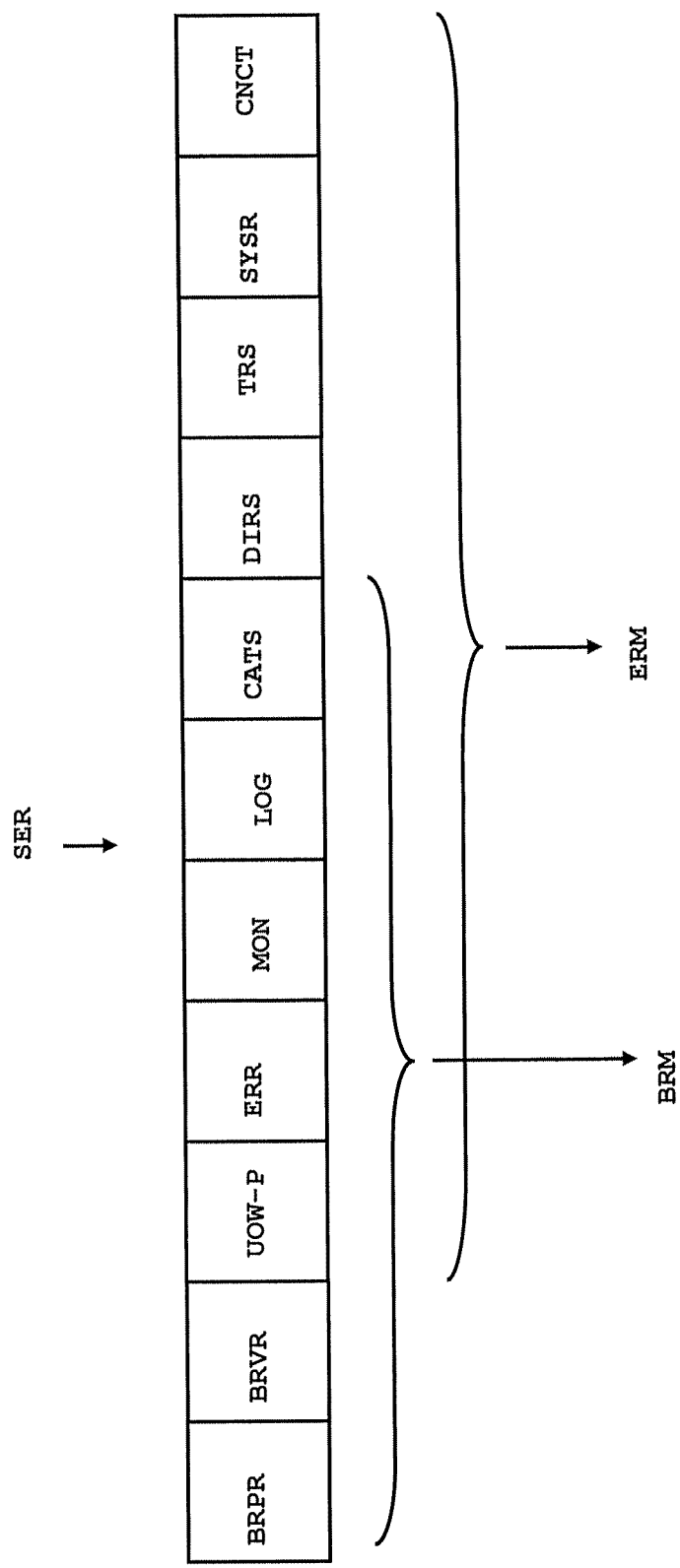
FIG. 3 schematically shows services provided by a service provider subsystem of the transaction management system of FIG. 1.

Making reference to FIG. 3, the services implemented by the service provider subsystem SER are schematically shown, in an embodiment of the present invention. Some of the services provided by the service provider subsystem SER are exploited by the business request manager BRM, other services are exploited by the extended resource manager ERM, and some services are exploited by both the business request manager BRM and the extended resource manager ERM. In particular, a subset of services is provided commonly to every task launched by the business request manager BRM, be it a task associated with a classified business request or a task associated with a non-classified business request. The list of services provided by the service provider subsystem SER includes: a business request cataloging service CATS, a directory service DIRS, a task recovery service TSR, a system recovery service SYSR, a connectivity service CNCT, a log service LOG, a monitor service MON, a UOW protection service UOW-P, an error recovery service ERR, a business request protection service BRPR, a business request verify service BRVR.

The services which are commonly provided to both classified and non-classified business requests include the log service LOG, the monitor service MON, the UOW protection service UOW-P and the error recovery service ERR.

The specific services for the classified business requests include, in addition to the common services, the cataloging service CATS, the business request protection service BRPR and the business request verify service BRVR.

The services exploited by the business request manager BRM include the business request protection service BRPR, the error recovery service ERR, the UOW protection service UOW-P, the business request verify service BRVR, the monitor service MON, the log service LOG and the cataloging service CATS.

The services exploited by the extended resource manager ERM include the cataloging service CATS, the log service LOG, the UOW protection service UOW_P, the monitor service MON, the error recovery service ERR, the connectivity service CNCT, the directory service DIRS, the task recovery service TSR and the system recovery service SYSR.

The business request classification scheme implemented by the business request manager BRM relies on the business request cataloging service CATS in order to classify an incoming business request as a classified business request CBR, listed in a business request catalog held by the cataloging service CATS, or a non-classified business request NCBR, not present in the catalog.

The services implemented by the service provider subsystem SER will be described in detail later on.

In operation, the business request manager BRM and the extended resource manager ERM classify the service requests, be they incoming business requests to the transaction processing system or service requests generated during the processing of a previously received business request, taking into account the nature of the component (application program, transaction, infrastructure service, e.g. a connector) to which the service request is directed and the logic state of the process associated therewith (running, backing out, pending, in-doubt etc.).

The behaviour of the business request manager BRM and the extended resource manager ERM depends on the status of the entity issuing the service request, on the kind of service request issued and on the status of the component to which the service request is directed.

Each service request, both coming from outside the system SYS or generated while servicing an already received business request, is analysed by the business request manager BRM. The service request may include an explicit indication that the service request is directed to the business request manager BRM or the extended resource manager ERM (explicit service request): in this case, the business request manager BRM either directly handles the service request or invokes the extended resource manager ERM. If the service request includes no such explicit indication (implicit service request), the service request is intercepted by the monitoring service MON and passed to the business request manager BRM. Exploiting the cataloging service CATS, the business request manager BRM determines the kind of service request. If the service request is classified, it will be handled by the business request manager BRM or by the extended resource manager ERM. If on the contrary the service request results to be non classified, it is routed back to and serviced by the transaction manager TM.

In an embodiment of the invention, the following classification scheme of the possible service requests is adopted.

Non-classified business requests (in the following referred to as NCBRs) are generic service requests issued in respect of transactions or programs managed by the transaction manager TM, which the business request manager BRM cannot associate with any of the service requests listed in a business request catalog held by the cataloging service CATS; the services provided by the business request manager BRM to the NCBRs are only those belonging to the subset of common services. An NCBR can issue any kind of business request, either explicit or implicit, classified or non-classified, as well as access system resources, either recoverable or not.

Classified business request (in the following referred to as CBRs) are service requests which the business request manager BRM can associate with one of the service requests listed in the catalog held by the cataloging service CATS.

Within the class of CBRs, the following categories of business requests are additionally defined.

Non-protected classified business requests (in the following referred to as NPCBRs) are CBRs for which the business request manager BRM provides all of the common services, plus the cataloging service CATS and the verify service VER. In case the processing of an NPCBR is not completed, due to errors or anomalies, the business request manager BRM does not undertake any action directed to the automatic re-activation of the business request, leaving the burden of this to the original requester of the service. An NPCBR may issue any kind of business request, either implicit or explicit, classified or non-classified, and access system resources, either recoverable or not.

Protected classified business requests (in the following referred to as PCBRs) are CBRs benefiting of all the services implemented by the business request manager BRM, including the protection service BRPR. Differently from the NPCBRs, if the processing of a PCBR is not completed due to an error or an anomaly, the business request manager BRM, exploiting the business request protection service, automatically manages the re-activation of the business request, so as to assure the processing thereof and the completion, possibly postponed. A PCBR may issue any kind of business request, either explicit or implicit, classified or non-classified, and access system resources, either recoverable or not. Should a PCBR (main PCBR) issue another PCBR (secondary PCBR), the protection service is only provided to the main PCBR, and not to the secondary one, to avoid multiple activations of the secondary PCBR. It is observed that secondary PCBRs issued by NPCBRs or NCBRs are not provided with the protection service, and are not automatically reactivated; in other words, only main PCBRs are reactivated.

Compensation business requests (in the following referred to as XBRs) are a particular kind of PCBR, activated for carrying out activities of backout or, more generally, compensation. The XBRs are directed to programs or transactions operating within the system SYS hosting the transaction manager TM. In particular, the XBRs are automatically activated by the extended resource manager ERM when the latter is notified by the resource manager coordinator RMC about an error or a backout request. An XBR, working under the control of the business request manager BRM and the extended resource manager ERM, may issue compensation outbound business requests (XOBRs, described later on), NCBRs and CBRs, as well as access system resources, either recoverable or not. Being a particular kind of PCBRs, XBRs benefit of the protection service, and are automatically reactivated.

As far as the OBRs are concerned, the following categories are defined.

Non-recoverable outbound business requests (in the following referred to as NROBRs) are service requests issued, explicitly or implicitly, by NCBRs or CBRs (either NPCBRs, PCBRs or XBRs), and directed to programs or transactions operating in a counterpart system C_SYS1, C_SYS2, either local or remote to the system SYS, or directed to a component of the system SYS but weakly linked thereto. For handling the NROBR, the ERM exploits the cataloging service CAT, the directory service DIR, the task recovery service TSR, the system recovery service SYS_R and the connectivity service CNCT. When anomalies or backout requests take place, the extended resource manager ERM does not undertake an attempt of recovery of the outbound business request. An NROBR may access system resources, either recoverable or not, as well as issue any kind of service request, depending on the business logic and the features of the counterpart system to which it is.

Explicit-compensation, recoverable outbound business requests (in the following referred to as EROBRs) are service requests issued by NCBRs or CBRs, directed to programs or transactions operating in a counterpart system C_SYS1, C_SYS2, or directed to a component of the system SYS but weakly linked thereto. When anomalies or backout requests take place, the extended resource manager ERM directly starts the activities for the explicit compensation of the EROBR; to this purpose, the services provided by the service provider subsystem SER, particularly the log service LOG, the UOW protection service UOW_P, the connectivity service CNCT, the monitor service MON and the error recovery service ERR are exploited. An EROBR may access system resources, either recoverable or not, as well as issue any kind of service request, depending on the business logic and the features of the counterpart system to which it is directed.

Implicit-compensation, recoverable outbound business requests (in the following referred to as IROBRs) are service requests, issued by NCBRs or by CBRs, directed to programs or transactions operating in counterpart systems, or directed to a component of the system SYS but weakly linked thereto. When anomalies or backout requests take place, the extended resource manager ERM does not directly start the activities for the compensation of the IROBR; on the contrary, the compensation is carried out implicitly, that means postponed to the time of re-execution of the IROBR; such a re-execution is managed automatically by the business request manager BRM if the IROBR is invoked by a PCBR, or it is activated by the service requester in case the IROBR is issued by a NPCBR. The extended resource manager ERM exploits the services provided by the service provider subsystem SER, in particular the log service LOG, the unit of work protection service UOW_P, the connectivity service CNCT, the monitor service MON and the error recovery service ERR. An IROBR may access system resources, either recoverable or not.

Compensation outbound business request (in the following referred to as XOBRs) are a particular kind of IROBR, and are service requests issued by XBRs operating within specific tasks, governed by the extended resource manager ERM in support of previously-issued EROBRs that need to be compensated or not yet compensated due to errors or backout requests. The XOBRs may also be activated by infrastructure services in the task recovery phase (described later on). XOBRs are directed to programs or transactions operating in counterpart systems or directed to a component of the system SYS but weakly linked thereto. When an anomaly takes place, the XOBRs are not activated automatically: only the XBRs, issued by the extended resource managere ERM, can activate the XOBRs. An XOBR can access system resources, either recoverable or not. The activation of the XBR and the XOBR is handled by the ERM, and no burden is put on the requester application, which can be waiting for the completion code of the task recovery phase or, in case a time-out is incurred, already notified about the taking in charge by the extended resource manager ERM of the recovery operation.

Any business request, either non-classified (NCBR) or classified (CBR) and, if classified, either protected (PCBR) or not (NPCBR), may thus issue (implicitly or explicitly) the one or more OBRs (either NROBRs, EROBRs, IROBRs).

The above described classification of the service requests, to be adopted in the development of new applications in order to correctly identify the components necessary for implementing the desired business process, guarantees that, in case of errors, anomalous events or backout requests, coordinated by the transaction manager TM through the resource manager coordinator RMC, the proper application or infrastructure components are activated for managing the compensation of everything has been done up to that point on the data involved in an EXT-UOW. It is thus guaranteed that, in case of errors, anomalies or application backout requests, the state of the resources involved in an EXT-UOW converge towards a coherent final state, by means of the automatic explicit compensation, or the postponed implicit compensation, governed by the business request manager BRM and the extended resource manager ERM.

In particular, in case of unsuccessful completion of a task involving an EXT-UOW, the business request manager BRM and the extended resource manager ERM are able to identify and automatically activate the processes for making the whole system (that is, the resources involved) converge towards the initial state, when possible, or towards a coherent state determined dynamically by the business request manager BRM, the extended resource manager ERM and the application business logic possibly embedded on the XBRs/XOBRs. Although any kind of XBR can be developed, a default XBR implements the compensation phase issuing in the reverse sequence the XOBRs related to each EROBR acting on the base of the outcomes of calls to the connectivity service CNCT, and the outcome of each invoked XOBR.

The services implemented by the business request manager BRM and the extended resource manager ERM will be now described in detail.

Cataloging Service CATS

The cataloging service CATS allows classifying the business requests according to the classification scheme described in the foregoing.

The cataloging service CATS operates on the basis of a catalog CAT, an example of which is schematically depicted in FIG. 4. The catalog CAT is a table having a plurality of records. Each catalog record includes a plurality of fields BRID/CLID, BRCLS, ASSCMP, STUPSTAT, IN-FLGT STAT, C-SYS, SUB C-SYS, HEADER, TRAILER, ASSBR, XBR/XOBR, USAUT/ACC, MSGFRMT, OTHER INFO.

The field BRID/CLID contains a business request identifier (A, B, C, . . . ), identifying a classified business request, or a business request class identifier (e.g. NPCBR, NCBR . . . ), identifying a business request class. The field BRID/CLID is the entry key to the catalog CAT.

The field BRCLS contains a business request class identifier (e.g., NPCBR, PCBR, OBR, XBR, XOBR), specifying the class of the business request identified in the associated field BRID/CLID.

The field ASSCMP contains an indication of the components (programs or transactions or both) associated with the business request identified in the associated field BRID/CLID. For example, for the business request identified as A no associated program or transaction is specified in the catalog: when the business request A is received, the component which is activated is A itself; differently, for the business request identified as P, the program PGh and the transaction Trk are specified, meaning that when the business request P is received, the program Pgh within the transaction Trk will be activated.

The field STUPSTAT defines the status (ON or OFF) to be attributed to the business request at the system start-up (described in detail later on). The field IN-FLGT STAT contains an indication of the current status of the business request, when it is in flight.

The field C-SYS defines, for the OBRs, the counterpart system to which they are directed. In case the counterpart system has one or more subsystem associated therewith, the field SUB C-SYS specifies to which subsystem of the counterpart system defined in the field C-SYS the OBR is directed to. The information stored in the fields C-SYS and SUB-C SYS forms access keys to the directory service.

The fields HEADER and TRAILER define business requests to be issued preliminary and, respectively, subsequently to servicing the business request identified in the associated field BRID/CLID. In the shown example, when the business request identified as A is received, before and after servicing it the business requests E and F are serviced, respectively.

The field ASSBR defines the business requests which can be issued while servicing the business request identified in the associated field BRID/CLID. Referring again to the shown example, when the business request identified as A is received (and after having serviced the header business request E), the business requests G and H are serviced (followed by the trailer business request F).

The field XBR/XOBR (mandatory for EROBRS) defines the compensation business requests (XBRs or XOBRS) to be executed for compensating the actions performed by the business request identified in the associated field BRID/CLID. In the shown example, in order to compensate the actions performed while servicing the business request A, the XBR J is issued (which in turn corresponds to the XOBR sequence L and M). If no specific XBR is specified for a given business request, a default XBR will be invoked for compensating the actions performed by OBRs issued within the business request; the compensation actions will be determined by the extended resource manager ERM on the basis of the information provided by the service LOG. It is observed that no compensation business requests can be associated with the XBRs and the XOBRs, since they are implicit compensation business requests, whose compensation is carried out on the basis of the information provided by the service LOG (indicating the activities already executed and those still to be executed).

Summarising, as far as the business request A is concerned, the information stored in the catalog CAT provides that when the business request A is received, the sequence of business requests E->G->H->F is actually issued and serviced; in case something goes wrong, compensation of the actions performed is carried out by the XBR J, which in turn corresponds to the sequence of XOBRs L->M. Concerning the business request B, it is an alias of the business request, P. In the event of a failure occurred after the issuing of the OBRs G and H, the default XBR is invoked by the extended resource manager ERM, and the reverse sequence involving the XOBRs L and M is automatically implemented.

The field USAUT/ACC defines the user authority level and account for the execution permission of the business request identified in the associated field BRID/CLID.

The field MSGFRMT defines the format of (specifies the set of rules for interpreting) the invocation message of the business request identified in the associated field BRID/CLID.

The field OTHER INFO is used to indicate that additional information can be stored in the catalog CAT.

In addition to records for specific business requests (such as the records identified as A, B, C etc. in FIG. 4), the catalog CAT may also include records providing default information for classes of business requests, such as the record identified as NPCBR (for all the business requests of the class NPCBR). When a business request is received which is not found in the list A, B, C etc., but is identified as an NPCBR, the information stored in the record NPCBR of the catalog are applied. In the shown example, the default information specified for the class NPCBR include an ON status to be attributed to every NPCBR at the system start-up, and an XBR Z, which is invoked in case of errors or backout requests for compensating the actions performed by one or more OBRs issued within the NPCBR.

Additionally, the catalog CAT may also include a record specifying default information in relation to NCBRs, such as the record NCBR in the shown example, to be attributed to any non-classified business request.

Finally, the catalog CAT may include records (such as the record NPCBR in the shown example) defining override information for specific classes of business requests.

The information retrieved from the catalog CAT contributes to the definition of the execution context of a business request. In particular, the cataloging process, or the process for defining the execution context of a business request, is the following.

When a business request is issued, information may be provided that defines the execution context of the business request. This information may be provided explicitly, in case of the business request is invoked explicitly, or deduced from the context of invocation of the business request, in case of an implicit invocation. Typically, an explicit invocation of a business request takes the form:

a) APPcallBRM(BR,inpData,[XBR],[CTXT/ANNL data],[tran],[user]);
b) BRcallERM(OBR,inpData,[C-SYS],[SUBC-SYS],[XOBR],[CTXT/ANNL data],[tran],[user]);
c) XBRcallERM(XOBR,OBRinp/out/CTXT/ANNLdata,[C-SYS],[SUBC-SYS],[tran],[user], [previous XOBR in/reply/outcome])

where a) represents the case of an application APP issuing a business request, either catalogued or not; b) represents the case of a business request (catalogued or not) issuing an OBR; and c) represents the case of an XBR invoking an XOBR during a compensation phase. The information in square brackets is optional. In particular, BR is the invoked business request identifier; inpData is the input message provided at the invocation; C-SYS, SUBC-SYS are the identifiers of the counterpart system and sub-system; XBR is the identifier of the compensation business request that will be activated by the system in case it is necessary to perform a compensation; XOBR is the identifier of the outbound compensation business request; CTXT/ANNL data represent information, provided at the invocation time, that can be used by the system during the compensation phase; tran and user define the context in which the invoked business request is to be executed (level of authority, transaction, etc.). The information provided at the invocation time of an XOBR (case c)) may include the information associated with the OBR to be compensated, including the outcome/reply message of the OBR.

This information is integrated with the information stored in the catalog. Different priority levels are assigned to the different sources of information; in particular, the information provided together with the invocation of the business request takes the priority over the information specified in the catalog for that business request, which in turn takes the priority over the default information specified in the catalog for the class of business requests. If present, the override information specified in the catalog for the class of business requests takes the highest priority.

It is to be observed that instead of a single catalog, two distinct catalogs may be provided for, one for the business request manager BRM and the other for the extended resource manager ERM. The catalog or catalogs may be structured in more than one table.

A dedicated component (configuration component) of the system SYS enables configuring the system, and particularly the catalog CAT.

Directory Service DIRS

The directory service DIRS provides information defining the execution context of the OBRs.

The directory service DIRS operates on the basis of a directory DIR, an example of which is schematically depicted in FIG. 5. The directory DIR is a table having a plurality of records. Each directory record includes a plurality of fields C-SYS, SUB C-SYS, ASSCMP, C-SYS ST-UP STAT, C-SYS IN-FLGT STAT, CNCT ID, CNCT ATTR, SIGN-ON, IN-DOUBT, BACKOUT, VER, SYS REC MODE, TO, USAUT/ACC, MSGFRMT.

The fields C-SYS, SUB C-SYS are the entry keys for the directory DIR. When an OBR is invoked, this information is derived from the cataloging process described above.

The field ASSCMP, similarly to the field ASSCMP in the catalog CAT, contains an indication of the components (programs or transactions or both) associated with the OBR. The information specified in this field of the directory overrides the one deriving from the cataloging process described above; if no associated component is specified in this directory field, the information deriving from the cataloging process is held valid. Referring to the shown example, each time an OBR directed to the counterpart system C-SYS2 is invoked, the remote program RMPGp within the remote transaction RMTRq will be executed.

The field C-SYS ST-UP STAT defines the status of the counterpart system at the start-up of the system SYS; if this field is set to ON, no system recovery procedure for the counterpart system needs to be performed at the start-up of the system SYS. The field C-SYS IN-FLGT STAT defines the current status of the counterpart system: if set to ON, this field indicates that the counterpart system is available.

The field CNCT ID provides the identifier of the connector that the extended resource manager ERM invokes for establishing the connection with the counterpart system. The connector is the component in charge of interfacing the system SYS and the counterpart system to which the OBR is directed. Interfacing is intended to include handling the communication protocol at both the logical and physical levels. For each counterpart system, one or more connectors can be defined, the choice of a given connector depending on communication problem considerations, on the communication paradigm adopted and on the nature of the OBR. Preferably, each connector is designed so as to be capable of supporting at a time multiple sessions with one or more counterpart systems (multiple OBRs directed to one or more counterpart systems). The connectors assist the extended resource manager ERM in carrying out any of the activities of OBR proposition, OBR compensation (XOBR), system sign-on and verify phases, resolution of in-doubt situations.

When a new OBR is developed, the connector to be associated therewith needs to be identified; if none of the available connectors is suitable, a new connector needs to be developed, according to the application protocol of the new OBR and the activation protocol of the extended resource manager ERM.

The field CNCT ATTR specifies information for the connector, such as attributes of the connection to be established, defining the kind of communication and the resources to be exploited for establishing the connection. This information overrides deafult information of the connector.

The fields SIGN-ON, IN-DOUBT, BACKOUT and VER respectively specify the sign-on procedure, the in-doubt procedure, the backout procedure and the verify procedure activated in the system recovery phase (described later on). If no specific procedures are identified in these fields, default procedures implemented by the extended resource manager ERM are exploited; if instead specific procedures are specified, these are activated in substitution of the default procedures.

The field SYS REC MODE specifies the system recovery/task recovery escalation paradigm (described later on) to be adopted by the business request manager BRM and the extended resource manager ERM for reacting to malfunctioning or unavailability of the counterpart system. Also in this case, a default paradigm can be defined, which is adopted if no specific information is provided in the directory.

The field TO specifies a time-out, i.e. the maximum time that the connector (and the extended resource manager ERM) is authorised to wait for a reply from the counterpart system; if the time-out lapses without receiving a reply, the operation is classified as in-doubt.

The fields USAUT/ACC and MSGFRMT contain information similar to that contained the corresponding fields of the catalog CAT; in particular, the field USAUT/ACC specifies the user, and the associated privileges, with which the business request is to be serviced. The field MSGFRMT identifies the format of the data provided with the invocation of the OBR.

When an OBR is issued, the information retrieved from the directory DIR (which is accessed through the access keys specified in the fields C-SYS and SUB C-SYS of the catalog CAT) completes execution context information derived from the cataloging process. Some pieces of information (in particular, the remote program/transaction associated with the OBR, the connection attributes, the time-out, the user and the message format) are provided to the connector when invoked by the extended resource manager ERM; the extended resource manager ERM directly exploits the information concerning the counterpart system status, the sign-on, in-doubt, backout and verify procedures and the escalation paradigm.

The directory DIR can be configured by means of the system configuration component.

Log Service LOG

The log service LOG is directed to storing, in a dedicated archive (log archive), synthetic and detailed information related to the activities of the system SYS, including the operations performed by the resource manager coordinator RMC and the resource managers RM, the business request manager BRM and the extended resource manager ERM. The stored information provides a logically coherent view of the events occurred, which can be used when compensation activities are required.

The information stored in the log archive is explicitly provided by the business request manager BRM or the extended resource manager ERM during the processing and/or the compensation of the business requests by the different infrastructural components involved.

The log service LOG operates as a resoure manager under the coordination of the resource manager coordinator RMC. The data are provided to the log service by the business request manager or the extended resource manager; the resoure manager coordinator coordinates the log service, similarly to the other resource managers. The log service determines how the information received by the business request manager or the extended resource manager in respect of any UOW are to be treated: if a given UOW is committed, the information stored in the log archive in respect of that UOW are consolidated; if the UOW is backed out, the information stored in the log archive in respect of that UOW are available for a possible compensation activity. The information provided by the business request manager or the extended resource manager are completed with information relating to the context in which the UOW is executed (such as for example a unit of work identifier, a status information, a unit of work completion code).

In order to allow a fast access to the information stored in the log archive, the log service logically organizes the information stored in the log archive. In particular, the information is organized by EXT-UOW, UOW of the EXT-UOW, task implementing the UOW, business request, OBR invoked within the business request and counterpart system to which the OBR is directed. The identifier codes of the EXT-UOWs, UOWs, tasks, business requests, OBRs and counterpart systems are exploited.

When a business request is received, the transaction manager TM activates a task, within which a transaction operates, implemented by a program. The transaction manager associates a UOW to the task, assigning thereto a univocal identifier code. If the business request is intercepted by the business request manager, a univocal identifier code is assigned thereto. If an OBR is issued within the business request, a univocal identifier code is assigned thereto. All these univocal identifier codes are provided to the log service.

By means of the log service, the detailed history of each service request (completed, not yet completed because in-flight or delayed) can be determined, including the explicit or implicit compensation activities.

In case of errors or in-doubt situations during the servicing of a service request, the context information (either supplied by the extended resource manager and/or collected directly by the log service) are stored in the log archive, to be used for a successive elaboration and/or evaluation task/system recovery services.

Reverting to the invocation formts listed above, at the time an OBR is invoked, the single OBR request can be accompanied by specific user data ANNL, also stored by the LOG service. These user data, becoming part of the OBR invocation context, can also be used for a successive elaboration and/or evaluation by the task recovery service and the system recovery service, being available to the XBR process or being directly supplied to the connectivity service CNCT.

The log service handles anchor points for identifying the EXT-UOWs, UOWs, tasks not yet completed. When an EXT-UOW is completed, a condition reached upon commit of the changes brought to the resources during the execution of the EXT-UOW or in consequence to a compensation action, the anchor points related to that EXT-UOW are deleted; in this way, it is at any time possible to easily determine which activities are being executed, suspended or waiting to be completed.

In the compensation phase, the information received or captured and stored in the log archive enables determining punctually the sequence of activities required for reaching a dynamically-determined coherent state. This information can also be mixed and/or rearranged at this time by the XBR component or by the connectivity service CNCT, so as to compose the XOBR input message. By default, in absence of any business logic added to the involved XBR or connector, the XOBR input message, built by the default XBR, can be one of the following (derived by the information stored in the catalog and/or in the directory):

the original OBR input message;

the OBR reply message;

the data CTXT/ANNL provided at the OBR invocation time;

a multi-segment message including the data IN/OUT/CTXT/ANNL.

More particularly, the data stored in the log archive depend on the component involved and the nature of the business request, as reported in the following table:

| business request type | data stored in the log archive |
|---|---|
| NCBRs and NPCBRs not invoking OBRs | errors or malfunctioning; invocation of secondary PCBRs or NPCBRs |
| NCBRs and NPCBRs invoking OBRs | errors or malfunctioning; invocation of secondary PCBRs or NPCBRs; invocation of OBRs; logical outcome of each OBR invocated; commit requests, and related outcome, for each invocated OBR; backout requests, and related outcome, for each invocated OBR; |
| PCBRs invoking OBRs | invocation message; invocation reply message and related outcome; errors or malfunctioning; invocation of secondary PCBRs or NPCBRs; invocation of OBRs; logical outcome of each OBR invocated; commit requests and related outcome; backout requests and related outcome |
| NROBRs | connector activation message or input message to the OBR; connector activation reply message or output message from the OBR; logical outcome of the OBR generated by the connector or infrastructure outcome; errors or malfunctioning; in-doubt resolution activity outcome (if any) |
| EROBRs and IROBRs | connector activation message or input message to the OBR; context information (if any) supplied for supporting the compensation activity; connector activation reply message or output message from the OBR; logical outcome of the OBR generated by the connector or infrastructure outcome; errors or malfunctioning; in-doubt situation resolution activity outcome (if any) |
| XBRs | XBR invocation message (provided to the XBR when invoked, including input information to the corresponding business request and output information generated by the corresponding business request); XBR invocation reply message and related outcome; errors or malfunctioning; invocation of XOBRs by the XBR; logical outcome of each XOBR invocated; commit requests and related outcome; backout requests and related outcome |
| XOBRs | connector activation message (including the information provided to the connector when invoking the associated OBR); connector activation reply message or output message from the XOBR; logical outcome of the XOBR generated by the connector or infrastructure outcome; in-doubt resolution activity outcome (if any) |

Error Recovery Service ERR

The error recovery service ERR is directed to controlling error conditions, due to malfunctioning in the applications or in the infrastructure. This service is activated by the transaction manager TM at the system start-up and whenever an error occurs during the execution of a service request directed to a transaction or program.

Before activating the error recovery service ERR, all the different applications or infrastructure components involved try to autonomously handle the error condition to either solve it or to issue a suitable signal. In general, not any error needs to be declared as such to the transaction manager TM; an error condition may be declassed to application error, and be handled by the respective application.

If the error condition persists (either because the application is not capable of handling the error condition or because the error condition cannot be declassed, the transaction manager TM activates the error recovery service ERR. The error recovery service ERR, within the UOW of the task that caused the error condition, classifies and handles the error condition; the context information is archived in the log archive by the log service LOG; this information can be useful to the task recovery service TR and the business request protection service PR.

In particular, the information acquired is related to the logical state of the business request manager BRM and the extended resource manager ERM (determining the handling of the error condition), the kind of activity under execution (normal processing, backout, compensation, in-doubt resolution, system recovery, task recovery), the type of components involved, and the kind of error and how it was generated.

The error recovery service ERR determines the operations to be performed, adopting one of the following actions:
a) confirmation of the error condition and return of control to the transaction manager TM; the transaction manager automatically activates the backout procedure managed by the resource manager coordinator RMC;
b) activation of the task recovery procedure by the task recovery service TRS, for collecting and organising information that will be used by the extended resource manager ERM; the control is then returned to the transaction manager TM, which automatically activates the backout procedure managed by the resource manager coordinator RMC; the resource manager coordinator will then invoke the extended resource manager ERM, which will perform operations in support of a possible compensation activity;
c) activation of the task recovery procedure by the task recovery service TRS, and inhibition of the error-handling procedure; the control is returned to the transaction manager TM for automatically activating the commit procedure managed by the resource manager coordinator RMC; the error condition is thus not handled by the transaction manager.

The error recovery service ERR does not directly take part to the phases of implicit or explicit compensation; this activities are managed by the extended resource manager ERM that, similarly to the other resource managers RM, is activated by the resource manager coordinator RMC in the phase of backout of the changes occurred during the execution of the service request.

In the a) and b) cases, a backout will be performed; the backout may involve a compensation procedure, which may be preceded by a task recovery phase.

Concerning cases b) and c), in order to assure that, even in case of application or infrastructure malfunctionings, the business resource manager BRM and the extended resource manager ERM, in charge of managing the postponed compensation activities, are properly activated, the error recovery service ERR always activates the task recovery service TRS in presence of PCBRs, XBRs and XOBRs.

UOW Protection Service UOW-P

This service guarantees the integrity of the UOWs under which one or more application programs operate in the processing of a service request. Exploiting the log service LOG, the UOW protection service UOW-P intercepts the explicit commit and backout requests issued by the applications involved in the processing of a business request, inhibiting the execution of the commit commands; the backout commands are executed and notified to business request manager BRM and the extended resource manager ERM, as well as made available to any other application or component, to allow the postponed handling of the possible misalignment incurred.

In particular, the UOW protection service prevents explicit commit commands from being executed in the case of a COO-UOW or an EXT-UOW, thus avoiding a fragmentation thereof; in the case of a backout command, the command is executed and the UOW protection service notifies the business request manager and the extended resource manager. The UOW protection service thus protects the integrity of COO-UOWs and EXT-UOWs, ensuring that all the activities executed for a service request are governed solely by coherent and non-fragmented UOWs. Each activity is thus implicitly considered completed only at the end of the processing, after the completion of the phases of input message acquisition, message processing, reply output message generation.

Thanks to the UOW protection service, the business request manager BRM assures that each service request is univocally processed and produces a univocal reply, avoiding the loss of input/output messages and/or the generation of multiple reply messages.

In this scenario, when a component (different from the business request manager and the extended resource manager) issues an explicit commit request, the processing is interrupted and an error condition is notified to the transaction manager; the error condition is intercepted by the error recovery service, which will handle the error condition as described hereinbefore. When a component issues an explicit backout request, the command is executed, but the UOW protection service notifies the backout event to the business request manager and the extended resource manager, so that the event is successively handled, during the task termination phase.

Task Recovery Service TSR

This service is responsible of handling a task recovery procedure.

During the execution of a generic task (in-flight task) for processing a business request, errors, handled by the error recovery service ERR, or backout requests, coordinated by the resource manager coordinator RMC, may take place. In both these cases, the task recovery procedure is activated: in the first case, by the error recovery service ERR, as described before, in the second case by the extended resource manager ERM, activated in turn by the resource manager coordinator RMC.

The task recovery procedure is also activated at the startup of the system SYS within a system recovery procedure (to be described later), after a system failure or shutdown, to allow the business request manager and the extended resource manager identifying the business requests to be activated or reactivated. In particular, the business request manager identifies and starts/restarts the PCBRs previously in-flight or waiting, while the extended resource manager identifies and starts/restarts the compensation business requests (XBRs) previously in-flight or waiting. To this purpose, the task recovery service merges the information obtained from the log service LOG and the information supplied by the resource manager coordinator RMC (for the in-flight tasks and for the pending compensation tasks), to collect (for each single task) the information necessary to the recovery phase in which the extended resource manager will be involved.

During the task recovery procedure, the data stored in the log archive are analysed to identify, for every single task, the current UOW and, for each identified UOW, the related state and the involved resources.

After this operation, a complete list is obtained of the previously in-flight or pending PCBRs, that have to be re-activated by the business request manager, and, for the extended resource manager, a complete list of the XBR/XOBR for compensating any previously in-flight business request and a list of compensation pending business requests.

The PCBRs are immediately reactivated by the business request manager; the activation of EROBRs is instead postponed after the completion of the compensation phase (if any).

The extended resource manager activates the compensation tasks either at the level of the single UOW, or in series to each other, at the level of the single counterpart system, depending on the information provided by the cataloging service CAT and the directory service DIR.

System Recovery Service SYS-R

Figure 6:
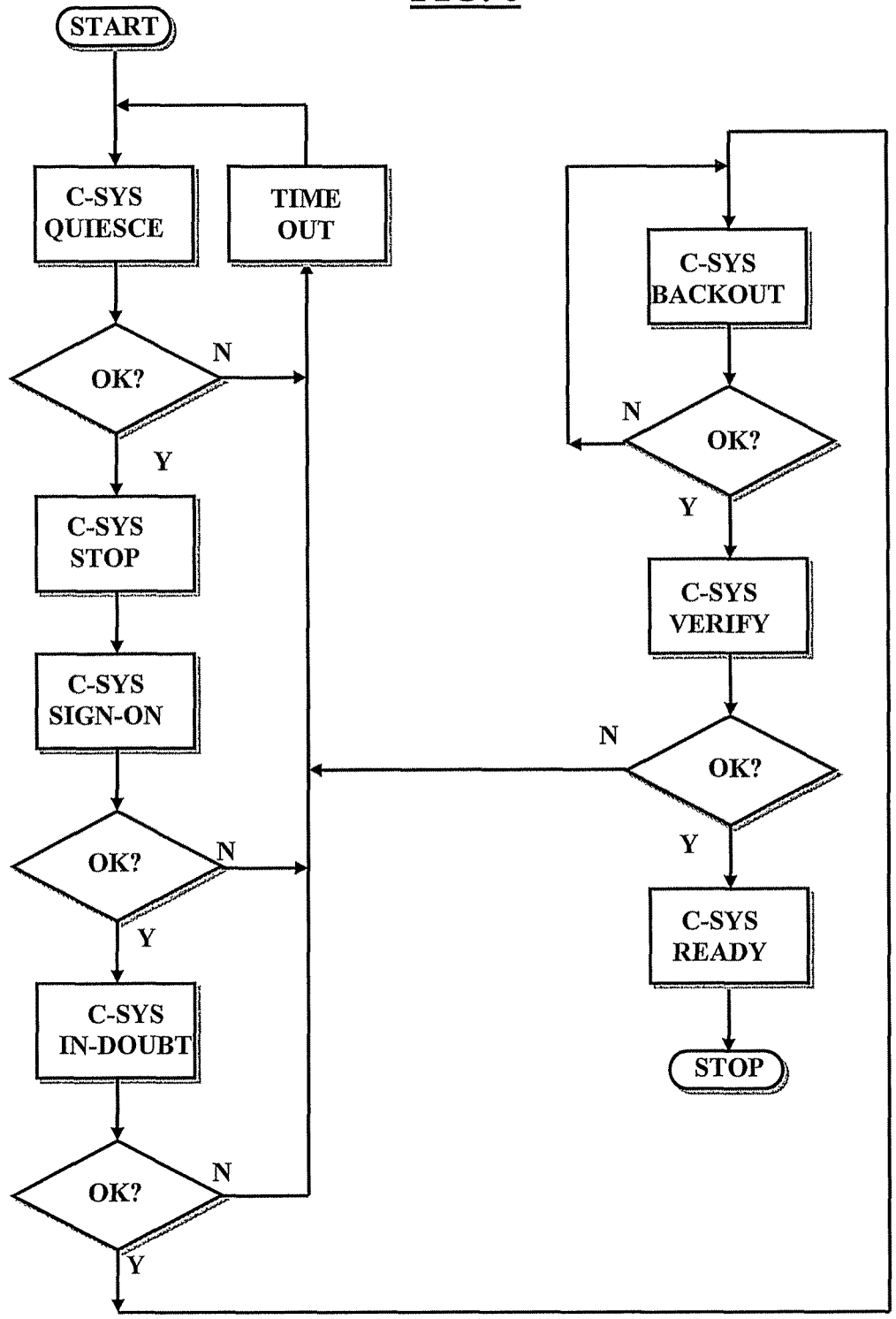
FIG. 6 schematically shows a system recovery procedure implemented by a system recovery service provided by the service provider subsystem.

This service handles a system recovery procedure (schematically shown in FIG. 6) that is carried out at the startup of the system SYS for each counterpart system defined in the table DIR held by directory service DIRS. In the system recovery procedure, the extended resource manager is mainly involved, albeit also the business request manager is partly involved as far as PCBRs are concerned.

The system recovery procedure allows establishing a univocal synchronicity point between the system SYS and the counterpart systems, e.g. the systems C-SYS1, C-SYS2, from which to proceed with the execution of the successive service requests.

In addition, the system recovery service also activates the system recovery procedure when anomalous events occur in connection with one or more counterpart systems; such anomalous events, intercepted either by the application components or by infrastructure services (extended resource manager), may make it necessary to re-align the system SYS and the counterpart systems, to establish a consistent point. In this case, the system recovery procedure is carried out selectively only in respect of the counterpart system(s) in which the anomalous events occurred.

An object of the system recovery procedure is to bring the logic state of the counterpart system (known to the system SYS from the fields C-SYS ST-UP STAT and SYS IN-FLGT STAT in the directory DIR) to ON, indicating that the counterpart system is operative, following a prescribed sequence of steps; to do this, both system and application functions may be activated, if necessary by the extended resource manager.

In particular, the system recovery procedure includes the following steps: counterpart system quiesce (in the following, simply referred to as C-SYS QUIESCE), counterpart system stop (C-SYS STOP), counterpart system sign-on (C-SYS SIGN-ON), counterpart system in-doubt (C-SYS IN-DOUBT), counterpart system backout (C-SYS BACKOUT), counterpart system verify (C-SYS VERIFY), counterpart system ready (C-SYS READY). These steps will be discussed in detail in the following.

In the C-SYS QUIESCE step, the extended resource manager ERM logically disables the counterpart system, setting the respective state in the directory DIR to QUIESCE. In this way, any possible new business request directed to the counterpart system is rejected (if non protected) or postponed (if protected) until the counterpart system is returned to the READY (ON) status by the extended resource manager. The completion of any in-flight activity, managed by the business request manager or the extended resource manager, related to the counterpart system is then waited for.

If this step cannot be successfully completed (for example because there are in-flight transactions involving the counterpart system and that cannot be completed) the whole system recovery procedure is postponed of a time interval defined in the directory DIR (in the time-out field TO). After that time interval has lapsed, the system recovery procedure is activated again.

In the C-SYS STOP step, entered in case of successful outcome of the C-SYS QUIESCE step, the extended resource manager forces to STOP the state of the counterpart system specified in the directory DIR. When the state of a counterpart system is STOP, it is ensured that no activity related to the counterpart system is running in the system SYS; the STOP state also declares that the counterpart system is not available for processing service requests. The compensation of UOWs is interrupted and postponed to the successive C-SYS BACKOUT step. The state of the counterpart system is automatically forced to SIGN-ON.

A counterpart system may be forced to the STOP state also by a command of a system manager component of the system SYS; in this case, the counterpart system remains in the STOP state until the system recovery procedure is successively re-activated.

In the C-SYS SIGN-ON step the system SYS establishes a logic link to and/or a consistency point with the counterpart system. Based on the information in the directory DIR (field SIGN-ON), the prescribed sign-on procedure intended to manage this activity for that counterpart system is identified and activated. If no specific sign-on procedure is declared in the directory for that counterpart system, the extended resource manager performs default actions, implemented by the connectivity service (i.e., the connector component). The identified sign-on procedure can ask for services to the extended resource manager ERM; these services, taking the form of NROBRs, carry out the phase of making the system SYS identified by the counterpart system (exploiting the information contained in the directory field USAUT/ACC), negotiating the counterpart system resources that the counterpart system will have to allocate for supporting the service requests coming from the system SYS, acquiring/negotiating the identification codes of the future OBRs. The OBR identification codes can remain in the application domain (i.e., they are known only at the connector level) or be declared to the extended resource manager, so as to be then automatically correlated (at the level of the log archive) to the future OBRs directed to the counterpart system; for each OBR the application invoking the service can thus declare to the extended resource manager ERM the identifier code associated with the invoked service request and to the received reply, in order to allow an automatic correlation between activation messages, reply messages and tasks executed on the counterpart system.

The successful outcome of the C-SYS SIGN-ON step involves an automatic transition (from SIGN-ON to IN-DOUBT) of the state of the counterpart system specified in the directory DIR. In case of unsuccessful outcome, the whole system recovery procedure is postponed of a time interval defined in the time-out field TO if the directory DIR.

In the C-SYS IN-DOUBT step, possible in-doubt situations arising from the counterpart system are detected and resolved. In-doubt situations are those in which the extended resource manager has not been able to acquire or univocally resolve the outcome of a generic OBR/XOBR issued in respect of the counterpart system. The resolution of in-doubt situations is essential for the successive C-SYS BACKOUT step, during which the unresolved or suspended UOWs associated with recoverable OBRs that generated an error will be analysed and elaborated. For example, if a counterpart system shuts down, or the communication link thereto falls during the execution of an OBR, the extended resource manager sees the OBR as in-doubt until the state of the counterpart system is ascertained (in the C-SYS SIGN-ON step).

The resolution of in-doubt situations provides for determining the outcome of each OBR/XOBR involved in an anomalous situation, and acquiring the reply message (if any) contextually generated. By anomalous situation it is intended any event that prevented the extended resource manager from acquiring the reply message: the anomalous situation may be due to a failure in the processing of the OBR/XOBR, or to a generic error caused by the counterpart system.

On the basis of the information present in the directory DIR, the specific procedure for managing the resolution of the in-doubt situation is identified and activated; if no specific procedure is identified, the extended resource manager performs default actions provided by the connectivity service. For the resolution of the in-doubt situation, the OBR/XOBR identification codes negotiated in the C-SYS SIGN-ON step can be exploited.

An in-doubt situation is considered resolved if the extended resource manager, on the basis of the information present in the log archive, is capable of ascertaining whether the operation has been executed on the counterpart system, which has been the outcome, and which reply message has been generated. Depending on the connector in charge of managing the connection with the counterpart system (specified for example in the directory field CNCT ID), different modes for resolving in-doubt situations are provided to the extended resource manager; for example, using the OBR/XOBR identifier code the connector may interrogate the counterpart system to know the last operation performed by the counterpart system, or the counterpart system may be capable of replying "done" or "undone" when explicitly requested if an OBR/XOBR has been executed.

The successful outcome of the C-SYS IN-DOUBT step causes the state of the counterpart system to automatically change from IN-DOUBT to BACKOUT. In case of unsuccessful outcome, the whole system recovery procedure is postponed of a time interval defined in the directory. When the system recovery procedure is performed on all the counterpart systems, and the in-doubt situations can be resolved only for some counterpart systems, these pass to the following step.

In the C-SYS BACKOUT step, the extended resource manager identifies the pending or unresolved UOWs relating to the OBRs issued in respect of the counterpart system. Once these UOWs are identified, the compensation thereof is or is not attempted, depending on the information provided by the cataloging service CATS and the directory service DIRS. In particular, compensation is attempted for the EROBRs, while the compensation is not attempted for the IROBRs; additionally, the state of the XOBRs defined in the catalog field ST-UP STAT, IN-FLGT STAT is verified: if the status is OFF, the XOBRs are not issued.

The activation of the compensation tasks takes place in the task recovery procedure, managed by the task recovery service TSR.

The way each UOW is compensated is determined on the basis of the following variables:

the cause of activation of the system recovery procedure (system SYS startup or occurrence of anomalies or in-doubt situations); this is determined from the state of the system SYS and the component that invoked the system recovery procedure;

the restart mode of the system SYS (cold or warm);

the compensation modality (implicit or explicit) of each OBR involved in the UOW;

the counterpart systems involved in any single UOW, and the respective modality of handling the recovery activity and the problem escalation paradigm (ASYS, SSYS etc.);

possible unilateral commands of purge of the UOW/OBR, issued through the system manager component;

outcome of each compensation step of the OBR: depending on the outcome of previous compensation steps, the compensation activity may proceed, be suspended and resumed later on, be interrupted or be early completed.

These variables are acquired hierarchically: the attributes (specified in the catalog CAT) of each OBR are subordinated to the attributes (specified in the directory DIR) of the counterpart system, and the highest priority is assigned to everything forced through the system manager component. In this way, the way the compensation procedure is handled can be differentiated, so as to enable a wide range of behaviors directed to controlling and/or overcoming anomalous events.

A UOW may include NROBRs, EROBRs and IROBRs. Typically, NROBRs are inquiry service requests, and are not subjected to explicit compensation.

As far as UOWs with only EROBRs are concerned, they are considered compensated when all the EROBRs have been compensated (by means of XOBRs). The following compensation modalities are provided for:

ASYS modality: all the pending OBRs of a UOW are compensated in a sequence that is the inverse of the original execution sequence; each compensation step is subjected to the application outcome of the preceding compensation step. The UOW is declared resolved when the sequence, dynamically determined by the extended resource manager, is successfully completed. The counterpart system passes from the BACKOUT state to the VERIFY state when all the related UOWs are resolved. An unsuccessful outcome or an error condition detected in this phase causes the suspension or the interruption of the compensation procedure; in this case, the counterpart systems involved in the UOW are declared in error and cannot pass through the C-SYS BACKOUT step, unless interventions through the system manager component take place or problem escalation sequences are defined in the directory DIR (causing the entering of the "SSYS", "BSYS" or "BERR" modalities, described hereinafter).

"SSYS" modality (default modality applied at the system restart time): the pending OBRs of a UOW are grouped according to the counterpart system to which the OBRs are directed; each group of OBRs is subjected to compensation, in inverse sequence compared to the original execution sequence, subordinated to the outcome of every operation. Each group of OBRs is considered resolved upon successful completion of the sequence, dynamically determined by the extended resource manager. The UOW is declared resolved when all the groups of OBRs are successfully completed. The counterpart systems then pass to the C-SYS VERIFY step. An unsuccessful outcome or an error condition detected in this phase causes the suspension or the interruption of the compensation sequence; in this case, the counterpart systems are declared in error and cannot pass through the C-SYS BACKOUT step, unless interventions through the system manager component take place or problem escalation sequences are defined in the directory, causing the passage to the "BERR" modality.

"BSYS" modality: all the pending OBRs of a UOW are compensated in the inverse sequence compared to the original execution sequence, and each compensation step is subordinated to the application outcome of the preceding compensation step. The UOW is declared resolved when the sequence, determined dynamically by the extended resource manager, is successfully completed. If an unsuccessful outcome or an anomalous event occur, the sequence is modified, so as to postpone the compensation of all the OBRs directed to the same counterpart system as the OBR that caused the unsuccessful outcome; such a counterpart system is declared in error and cannot pass through the C-SYS BACKOUT phase, unless interventions through the system manager component take place. A counterpart system which is not declared in error can pass to the following C-SYS VERIFY step.

"BERR" modality: in this modality, instead of proceeding by single counterpart system, the compensation proceeds by single operation. All the pending OBRs of a UOW are compensated in the inverse sequence compared to the original execution sequence, and each compensation step is executed independently of the outcome of the preceding compensation step. The UOW is declared resolved when the sequence of compensation steps, determined dynamically by the extended resource manager, is successfully completed. If a compensation step gives an unsuccessful outcome, or anomalous events take place, the compensation of the involved OBR is postponed, and the following OBR in the sequence is submitted to compensation. The counterpart system associated with an OBR in error is declared in error and cannot go through the C-SYS BACKOUT step, unless intervention through the system manager component take place; otherwise, the counterpart system passes to the following C-SYS VERIFY step.

For UOWs including only IROBRs, no direct compensation action is undertaken; the compensation is postponed to a successive re-activation of the business request that issued the NROBRs or the IROBRs. All the associated UOWs are suspended. The involved counterpart systems can pass to the following C-SYS VERIFY step.

UOWs including both EROBRs and IROBRs are subjected to compensation as described previously as far as EROBRs are concerned, while no direct compensation action is undertaken for the IROBRs. If all the EROBRs are successfully resolved, the UOW is declared compensated or suspended; in case serious anomalies take place, the UOW is declared in error. If no errors take place, the compensation of the IROBRs is postponed to the next reactivation of the business request that issued them, as discussed above; the involved counterpart systems can pass to the C-SYSTEM VERIFY step. The presence of EROBRs in error causes the compensation activity to be postponed, and the associated counterpart system cannot pass to the C-SYS VERIFY step, unless interventions through the system manager component take place.

When all the backout activities are completed, i.e. all the pending UOWs are resolved or forced by interventions of the system manager, or if there are no pending UOWs having pending OBRs whose explicit compensation is to be executed by the counterpart system, a counterpart system can pass to the C-SYS VERIFY step. The counterpart systems that cannot pass to the C-SYS VERIFY step are subjected to a postponed re-activation of the C-SYS BACKOUT step; if an unsuccessful outcome is once again produced, the whole system recovery procedure is postponed of a time interval specified in the directory field TO.

In the C-SYS VERIFY step the system SYS verifies the logical coherence of the operations executed in respect of the counterpart system or systems to which the OBRs are directed. On the basis of the information stored in the directory field VER, the specific procedure (verify procedure) for managing the C-SYS VERIFY step is identified and activated. The verify procedure may ask for services (taking the form of NROBRs) to the extended resource manager for carrying out the verify activities; these activities may include acquiring/negotiating the identifier codes of the OBRs directed to the counterpart system, and comparing the acquired/negotiated identifier codes to the identifier codes acquired/negotiated in the C-SYS SIGN-ON step, to verify that the system SYS and the counterpart systems are still aligned. Alternatively, the acquisition/negotiation of the OBR identifier codes may not be carried out in the C-SYS SIGN-ON step, and be performed only in this step. Each OBR may declare to the extended resource manager the identifier code associated with the request and/or received reply, so as to enable an automatic association of the identifier code with the BRID, or accept the automatic association carried out by the extended resource manager. If no specific procedure is declared in the directory DIR, the extended resource manager performs default actions implemented by the connectivity service.

The successful outcome of the C-SYS VERIFY step determines an automatic transition of the state of the counterpart system from the VERIFY state to the READY (ON) state. In case of unsuccessful outcome, the whole system recovery procedure is postponed of a prescribed time interval, specified in the directory field TO.

The C-SYS READY phase is entered after having ascertained the availability of the counterpart system for managing the application traffic, formed by both generic OBRs and XOBRs. When the READY state is reached, the directory field C-SYS IN-FLGT STAT for the counterpart system is set to ON, and the counterpart system processes both newly-issued OBRs and anything waiting to be executed (because previously postponed and now requested again by the extended resource manager); the business request manager re-launches PCBRS that are still waiting or were previously delayed due to unavailability of the counterpart system. In particular, the OBRs are diverted by the extended resource manager ERM to the connector associated to the counterpart system (specified in the directory field CNCT ID), and are monitored by the monitor and log services. In case of error, the extended resource manager, coordinated by the resource manager coordinator RMC, handles the possible compensation activities. The counterpart system remains in the READY state up to the re-activation of the system recovery procedure, triggered by serious malfunctionings, in-doubt cases, unavailability of the counterpart system (for example due to a counterpart system/connection link failure), or until the counterpart system is forced to the STOP state through the system manager component.

Business Request Protection Service BRPR

This service is exploited by the business request manager BRM for automatically re-activating of the PCBRs. In particular, this service manages a business request queueing.

Business Request Verify Service BRVR

This service is exploited by the business request manager BRM for verifying that a same business request, different from a PCBR not yet completed, is not inadvertently reproposed one or more times. This service, on the basis of the information provided by the cataloging service CAT, can: enable the processing of the business request in any case (default condition); interrupt the processing of the business request; enable the processing of the business request if a previous attempt was interrupted due to a generic condition of error; return, in response to the business request, the previous outcome/reply message. The identification of the business request may be context-sensitive (input message data), or be based on a unique user identifier associated with the business request at the time it is issued.

The business request verify service is also exploited by the extended resource manager ERM for managing the IROBRs at the time they are reactivated.

Connectivity Service CNCT

This service includes a plurality of connector components, which the extended resource manager ERM exploits for establishing a connection link with the desired counterpart system. The appropriate connector is determined from time to time on the basis of the information stored in the catalog CAT and the directory DIR. The connector performs several functions, and particularly manages the communication between the system SYS and the counterpart systems; the connector may also perform conversion of communication protocols and message formats.

In particular, the connector input and output information is:

1a) case of OBR invocation (the sequence of actions leading to the connector activation is BRcall->ERM>CNCT->OBRAPPLexec):
connector input: directory data, OBR ID, [OBR identifier/counter], [CTXT data]
connector output: OBR reply message, physical/logical outcome, [OBR identifier/counter];

b) case of XOBR invocation (the sequence of actions leading to the connector activation is
ERMcall->XBRcall->ERM->CNCT->XOBRAPPLexec)
connector input: directory data, XOBR ID, XOBR input data, OBR input/reply/outcome data, [OBR CTXT/ANNL data], [XOBR/OBR identifiers/counters],[previous XOBR input/reply/outcome]
connector output: XOBR reply message, XOBR physical/logical outcome, [XOBR identifier/counter];

c) case of invocation in the C-SYS SIGN-ON, IN-DOUBT, and VERIFY steps of the system recovery procedure (the sequence of actions leading to the connector activation is:

ERMcall->[UserProg in Directory->]CNCT>[OBRAP-
   PLexec]) for invocation in the C-SYS SIGN-ON and
   VERIFY steps:
connector input: directory data, [local OBR/XOBR identifiers/counters]
connector output: physical/logical outcome, [negotiated OBR/XOBR identifiers/counters]
for invocation in the C-SYS IN-DOUBT step:
connector input: directory data, OBR/XOBR: input data, [identifier/counter], [CTXT/ANNL data],
connector output: OBR/XOBR: physical/logical outcome, [reply message],[identifier/counter]
where data in square brackets are optional.
Monitor Service MON This service intercepts commands issued to the transaction manager, and routes the commands to the business request manager; the business request manager, exploiting the cataloging service CATS, determines which infrastructure component (the business request manager itself, the extended resource manager for the OBRs, or the transaction manager for the NCBRs) will handle the command.

The operation of the transaction manager TM will be now discussed.

When the system SYS is started up, a system start-up procedure is launched. The system start-up procedure activates the business request manager BRM and the extended resource manager ERM, and informs the transaction manager TM and the resource manager coordinator RMC of the availability of these infrastructure components; also the service provider subsystem SER is activated.

The start-up procedure also acquires information from the resource manager coordinator RMC, and particularly the list of the pending UOWs. On the basis of this list, the extended table manager ERM scans the log archive, and generates a matrix wherein, for each pending UOW, the involved XOBRs and counterpart systems are indicated. The system recovery service SYS-R is invoked: for each counterpart system found in the matrix, a system recovery procedure is activated, which will be carried out on the basis of the information specified in the directory DIR. The system recovery procedure is completed once the prescribed sequence of steps, described hereinbefore, is carried out for each counterpart system.

The task recovery service TSR is invoked: for each UOW in the matrix, a task recovery procedure is activated; the task recovery procedure is however postponed to the time when the counterpart systems involved in the UOW reach the state BACKOUT (if the UOW also involves EROBRs) or the state READY (if the UOW involves IROBRs).

The task recovery service TSR is exploited for re-activating the tasks still pending; the task recovery procedure carried out by the task recovery service enables the business request manager BRM identifying, on the basis of the information stored in the archive of the log service LOG, PCBRs still not completed, which need to be re-activated.

The transaction manager TM can be started up in either one of two modes, conventionally referred to as warm or cold. In the cold mode, differently from the warm mode, the tasks still pending after the previous system shut-down are not handled, and thus not compensated; the C-SYS BACKOUT step of the system recovery procedure is not executed in respect of the EROBRs.

In case of a warm start-up, the business request manager BRM re-activates PCBRs still not completed or queued (delayed) at a previous system shut-down. The extended resource manager ERM manages OBRs that were still not completed or resolved (i.e, in-doubt) at the system shut-down.

Once the system recovery procedure is completed, the system SYS and the counterpart systems C-SYS1, C-SYS2 are synchronised, and the pending business requests can be re-issued, as well as new business requests can be accepted.

At the shut-down of the system SYS, the transaction manager TM notifies the shutting down to the business request manager BRM and the extended resource manager ERM. The business request manager BRM and the extended resource manager ERM can either reject a new service request or put it in the queue managed by the business request protection service BRPS; if the new business request is a PCBR, it is accepted, put in the business request queue and serviced as soon as possible; if the business request is an NPCBR, it is rejected.

The business request manager BRM waits for the transaction under processing to be completed. The extended resource manager ERM waits for the completion of possible compensation activities relating to the UOWs previously in error or backed out.

If the timeout in the directory DIR for the counterpart system lapses, or in case of a forced shut-down of the system SYS, and either the transaction under processing or the compensation activities of the UOWs previously in error or backed out cannot be completed, at the next start-up of the system SYS the system recovery procedure and the task recovery procedure are re-executed, so that business request manager BRM and the extended resource manager ERM can restart the PCBRs and the pending UOWs (provided that the transaction manager TM is restarted in the warm mode).

During the system SYS operation, if the extended resource manager ERM does not obtain and store in the log archive the reply/outcome message generated by a generic OBR, an in-doubt situation is established. Preliminary to any other activity, in-doubt situations are to be resolved. In order to retrieve the information relating to the activation and completion of every OBR resulting in-doubt, the extended resource manager ERM activates the connector associated with the OBR (specified in the directory DIR).

In particular the extended resource manager ERM, exploiting the identifier code of the OBR, carries on the following inspection.

Firstly, the extended resource manager ascertains that the OBR has been activated; in the negative case (for example, as a consequence of the above-mentioned queueing mechanisms), the OBR is considered not executed, and the activation message (if any) is deleted. The in-doubt situation is thus resolved, enabling the system to perform the compensation activities, if necessary; should the in-doubt OBR be the only OBR within an EXT-UOW, the compensation activity would not even be necessary.

If it is instead ascertained that the OBR has been activated, the extended resource manager ascertains whether the OBR is still in execution; this may occur when the primary task, that issued the OBR, must respect a timeout. In this case, it is possible to wait for the completion of the OBR and the acquisition of the reply message/outcome, or the OBR can be aborted and declared in error, so as to cancel the results of the OBR in the backout phase. The in-doubt situation is thus resolved, enabling the system to perform the compensation activities, which are required in the case the OBR forcedly aborted used non-recoverable resources.

In case the extended resource manager waits for the completion of the OBR, the logical outcome thereof is verified. The OBR reply message/outcome may or may not be available, depending on the nature of the protocol adopted for the activation of the OBR. The acquisition of the reply message/outcome is useful for simplifying the determination of the compensation activities.

If the reply message/outcome is missing, although the OBR formally results correctly executed, there is no information on the processing logical outcome and on how the processing has been classified by the counterpart system; this information is typically included in the reply message. The acquisition of the reply message/outcome allows determining the logical outcome of the service request, on the basis of an application or infrastructural internal coding, directly interpreted by the involved connector or by the XBR. On the basis of the outcome, it can be established whether the OBR produced the expected result, and thus a compensation phase is required, or no compensation activity is required in the event of a failure or a backout request.

If the reply message/outcome cannot be acquired, the OBR is automatically submitted to compensation, or the system recovery procedure is started.

If the OBR is aborted, and only recoverable resources where involved, a compensation phase is not required. Differently, if the OBR used non-recoverable resources, the in-doubt situation is only partially resolved, because changes (even partial) operated by the OBR may exist. The compensation phase, necessary in this case, can be preceded by a preliminary verify of what partially done by the OBR before being aborted. This situation is notified by the extended resource manager upon activation of the connector associated with the XOBR.

An indirect support to the resolution of the in-doubt situations can be obtained by the activation of the system recovery procedure, which includes the preliminar C-SYS SIGN-ON step and the final C-SYS VERIFY step, during which it is possible to handle, for each counterpart system, re-alignments between the counterpart system and the system SYS. In this way, the identifier codes of the OBRs directed to that counterpart system are acquired/negotiated; exploiting the acquired/negotiated identifier codes, it is possible to acquire from the counterpart system information on the last operations directed thereto/completed, and thus automatically solve in-doubt cases on the basis of the information retrieved from the counterpart system.

In case the in-doubt situation cannot be resolved automatically, a generic user/system manager may be directly involved who, after having carried out the necessary checks, provides indications on how each in-doubt situation is to be treated by the system, that is: the in-doubt situation is to be considered resolved because the OBR does not result executed, and no compensation is required, or the in-doubt situation is to be considered resolved because the OBR results even only partially executed, and requires compensation.

Even though the way an in-doubt situation is resolved is common to the different types of OBRs, the different nature of each OBR affects the system behavior in the successive compensation phase (if such a phase is required). After having ascertained the execution of the OBR and the outcome thereof, the compensation actions are the following:

NROBRs: these OBRs, generally associated with inquiry service requests, are not submitted to any compensation action. The resolution of possible in-doubt situations is optional; it may be useful for verifying the correct operation of the whole system, but the check of the OBR execution and, if available, the acquisition of the reply message/outcome do not trigger any successive elaboration.

IROBRs: these OBRs are associated with both inquiry and modify service requests; in this latter case the resolution of possible in-doubt situations is mandatory. No direct compensation action is undertaken. The re-elaboration, triggered by possible re-elaboration of the business request that issued the OBR, involves the acquisition of everything logged by the extended resource manager during the phase of acquisition of the reply message/outcome, or the direct activation of the OBR, directed to the re-elaboration thereof by the counterpart system, and the management of the reply message/outcome of such re-elaboration.

EROBRs: these OBRs normally involve changes to the resources. The resolution of possible in-doubt situations is mandatory. The compensation activity consists in the direct activation of the associated XOBR, or the activation of the associated XBR.

XOBRS: these OBRs are issued by the involved XBR, and are treated by the system like IROBRs. The resolution of possible in-doubt situations is mandatory. Errors produced during the execution of an XOBR are implicitly compensated by the extended resource manager ERM, or the interruption in the elaboration flow of the XOBR or of the XBR is automatically handled and re-activated by the extended resource manager ERM. The XOBRs that were previously terminated successfully are considered executed, while the respective reply messages/outcome are used for determining the successive compensation actions. The non-executed XOBRs are re-activated, so that the counterpart system can elaborate them and produce the expected reply message/outcome. The activation of an XBR is accompanied by the notification of the OBRs to be compensated and of what previously requested/executed, together with the related reply messages/outcomes. The XBR may proceed to the compensation phase through the direct or postponed execution of specific activities directed towards archives or processes.

A correct managing of EXT-UOWs requires system resource assignment criteria different from those adopted in conventional transaction management systems.

In order to reduce the problems of integrity in the case of EXT-UOWs, the connectivity service CNCT implements a queueing of activities, directed to serializing the logical resources from time to time defined at the level of each task. Depending on the type of queueing and on the duration thereof, a task can acquire the control of the resources logically related thereto and keep such a control until the task is completed or, if it is case, the compensation phase is completed.

In particular, the business request manager and the extended resource manager allow defining logical entities and manages the access thereto. Each logical entity, once defined, can be acquired by one or more tasks, on the basis of the type of access requested by each task. Depending on the type of logical entity and on the type of access requested, the following exclusive/non-exclusive rights of use (LOCK) can be assigned to the tasks:

exclusive access right assigned to a task, and queueing of the other tasks; the queueing is for example of the "first-in-first-out" (FIFO) type;

exclusive access right in modify assigned to a task, with read access right assigned to other tasks, and queueing (e.g., FIFO) of any other task requesting changes.

The time of validity of each LOCK may change depending on the type of logical entity and the nature of the task requesting the service. In particular, the following time windows are provided for:

TASK time window: the right of use of a logical entity by a task remains active from the time the request is issued until the end of the task;

UOW time window: active from the time the request is issued until the completion of a specific UOW;

EXT-UOW time window: active from the time the request is issued until the completion of all the involved UOWs, including the possible compensation phase. It is worth pointing out that the extended resource manager ERM is able to correlate UOWs composing an EXT-UOW implemented by the system during the processing of a business request, even if each UOW is known by the transaction manager TM and the resource manager coordinator RMC as a UOW compliant to the single- or two-phase commit protocol, but the different UOWs are not directly correlated;

SYSTEM time window: active from the time the request is issued until the detected availability of a specific remote system, including the completion of all the possible compensation activities directed to such a system;

GENERIC time window: active from the time the request is issued until an explicit command of de-queueing is issued.

Figure 7:
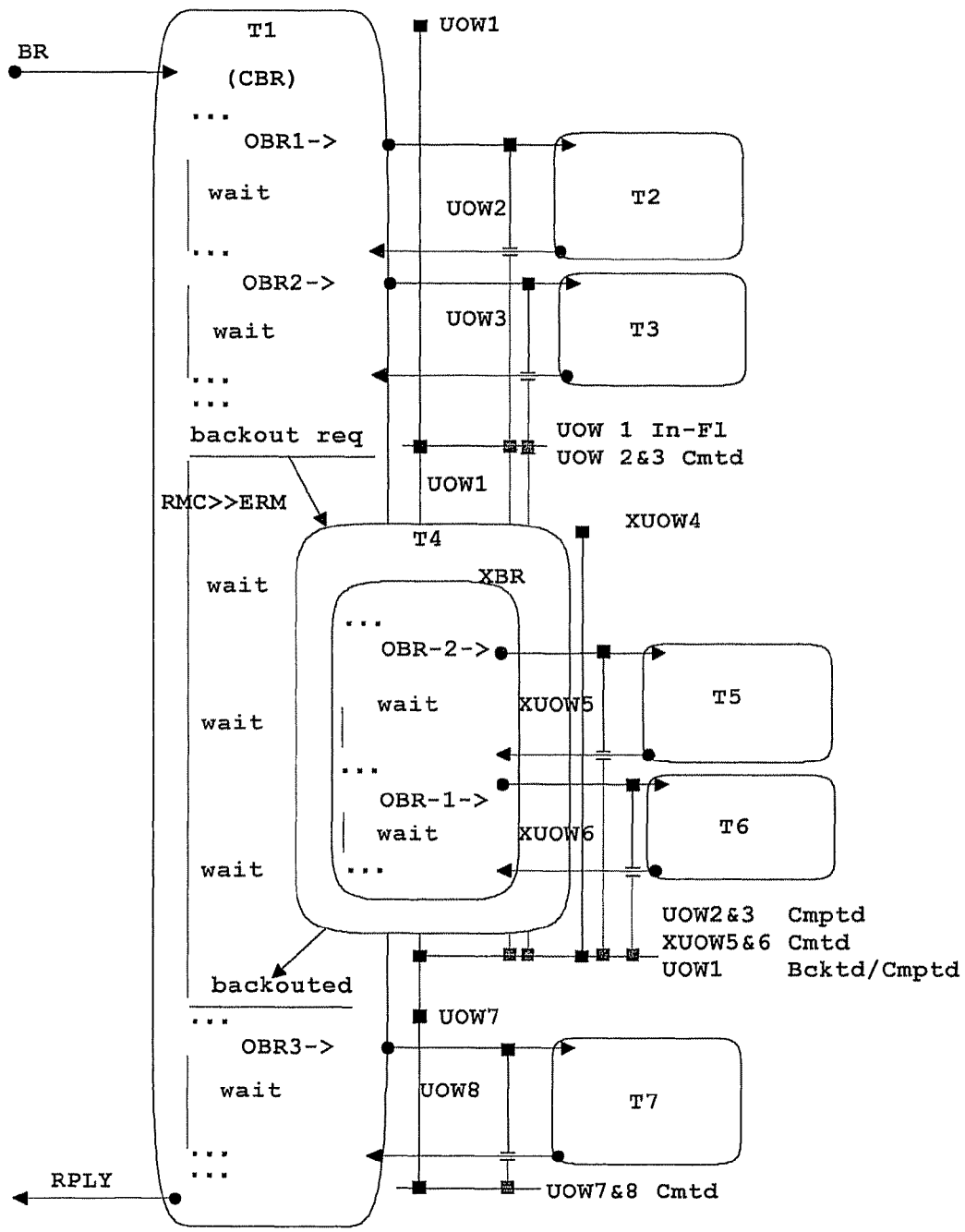
FIG. 7 schematically shows the operation of the transaction management system.

An example of the operation of the transaction processing system is schematically depicted in FIG. 7. Let it be assumed that the transaction manager TM receives a business request BR, listed in the catalog as a classified business request CBR. A task T1 for servicing the business request is activated, involving a UOW UOW1. During the processing of the task T1, an OBR OBR1 is first issued, directed to one of the counterpart systems C-SYS1, C-SYS2; a task T2 for servicing the OBR OBR1 is activated in the counterpart system, involving a unit of work UOW2. When the task T2 terminates successfully, the UOW UOW2 is committed. The task T1 then issues a second OBR OBR2, directed to either the same or another counterpart system. A task T3 is started in that counterpart system, processing the service request within a UOW UOW3. When the task T3 is successfully completed, the UOW UOW3 is committed.

Let it be assumed that, at this time, a backout request of the still in-flight UOW UOW1 is received by the resource manager coordinator RMC. The resource manager coordinator RMC invokes the extended resource manager ERM, which will manage the backout or compensation activities for bringing the system back to the initial state, if possible, or bringing the system to another coherent state. Let it also be assumed that the business request received by the transaction manager TM has an associated XBR XBR in the catalog. The XBR XBR is invoked, causing a task T4 to be activated, associated with a UOW UOW4. In order to carry out the compensation of the UOWs UOW2 and UOW3, the actions previously performed are carried out in the inverse sequence. XOBRs OBR-2 and OBR-1 are issued in sequence, causing the activation of respective tasks T5 and T6 in the counterpart systems; processing of the tasks T5 and T6 involves compensation UOWs XUOW5 and XUOW6. When both the tasks T5 and T6 are successfully completed, and the UOWs XUOW5 and XUOW6 are thus committed; the UOWs UOW2 and UOW3 have been compensated (any error condition raised in this phase forces the interruption of the compensation phase, the waiting task T1 can be positively postponed, or notified of the event or abended. only the compensation activity will be postponed, a new XBR will be instantiated and the failing XOBR started, being treated by the system like an IROBR). The UOW UOW1, up to now still in-flight, has thus been backed out, and is terminated.

The task T1 goes on processing the business request BR, and a new UOW UOW7 is entered. During the UOW UOW7, a new OBR OBR3 is then issued by the task T1, directed to one of the counterpart systems; a task T7 is launched in that counterpart system for servicing the OBR OBR7 within a UOW UOW8. When the task T7 is successfully terminated, the UOWs UOW8 and UOW7 are committed. The business request BR has thus been serviced, and a reply message is returned to the application that issued the business request BR.

In summary, the present invention provides a method and a system for developing and managing new business processes, compliant to a commit/backout protocol, allowing to exploit already existing processes individually compliant or not compliant to the commit/backout protocol. In particular, in the development of a new business process, the components of the new business process should be identified (business request, OBR, XBR, XOBR and connector). The business logic should be placed at the level of the business request; the compensation business logic (if specified) should be placed at the level of the XBR or connector; the integration logic should be placed at the level of the connector; alternatively, it is to be spread at the level of the XBR and business request; data parsing should be placed at the level of the business request or, if not possible, at the level of the connector; the communication outcome at the network infrastructure level should be handled by the connector; and the logical outcome of a business request should be generated by the business request, by the XBR, or by the connector.

Although the present invention has been disclosed by way of some embodiments, it is apparent to those skilled in the art that several modifications to the described embodiments, as well as other embodiments of the present invention are possible, without departing from the scope thereof as defined in the appended claims.

The invention claimed is:

1. A method for managing transactions, said method comprising:
providing at least one resource manager (RM) for managing changes to respective system resources of a data processing system;
providing a resource manager coordinator (RMC) for coordinating commit-backout activities of the at least one resource manager, said resource manager coordinator (RMC) being hosted by the data processing system;
receiving, by the data processing system, a business service request from a remote computer system to perform a task, said task comprising compliant processes complying with a commit/backout protocol and non-compliant processes not complying with a commit/backout protocol, said compliant processes running on the data processing system and said non-compliant processes running on a counterpart processing system that is coupled to the data processing system by a labile link, wherein the commit/backout protocol is characterized for non-compliant processes by compensations implemented in accordance with backout actions performed during execution of the non-compliant processes.

2. The method of claim 1, said method further comprising:
providing at least one extended resource manager (ERM) comprised by the data processing system for managing an execution and compensation of the task, said resource manager coordinator (RMC) being adapted to coordinate compensation services of the at least one extended resource manager (ERM); and
determining by the at least one extended resource manager (ERM), upon receipt of a backout request resulting from the execution of the compliant processes running on the data processing system and the non-compliant processes running on the counterpart processing system, compensation actions to transform the system resources into a mutually consistent state that differs from an initially consistent state of the system resources that existed prior to the execution of the non-compliant processes, wherein changes to the system resources resulting from the execution of the non-compliant processes transform the system resources into a mutually inconsistent state.

3. The method of claim 2, wherein the changes to the system resources resulting from the execution of the non-compliant processes cannot be backed out to transform the system resources from the mutually inconsistent state to the initially consistent state due to the labile link and associated communication problems between the data processing system and the counterpart processing system.

4. The method of claim 2, said method further comprising:
recording information, by an information recording service, concerning the compensation actions performed during the execution of the non-compliant processes; and
determining, by the extended resource manager (ERM), the compensation actions on the basis of the information recorded by the information recording service.

5. The method of claim 2, said method further comprising:
backing out the changes to the system resources resulting from execution of the compliant processes before performing the compensation actions, resulting in generation of misaligned logically-correlated data associated with the task;
after completion of said backing out and before performing the compensation actions, rendering the misaligned logically-correlated data public to other tasks; and
performing the compensation actions after said rendering the temporarily misaligned logically-correlated data public to other tasks.

6. The method of claim 1, wherein the data processing system is a front-end server of a banking system, wherein the remote computer system comprises a bank ATM from which the business service request is received by the data processing system, and wherein the counterpart processing system is a server in a banking agency.

7. The method of claim 1, wherein a table comprising a plurality of rows and a plurality of columns describes a plurality of business service requests that includes a business service request A consisting of said business service request, wherein each business service request of the plurality of business service requests is described in a different row of the plurality of rows, wherein a BRID/CLID column of the plurality of columns identifies each business service request of the plurality of business service requests, wherein an ASSBR column of the plurality of columns identifies zero or more business service requests to be serviced while the business service request in the BRID/CLID column is serviced, wherein a XBR/XOBR column of the plurality of columns identifies a business service request of the plurality of business service requests to be executed for performing compensation actions if a backout request results from execution of non-compliant processes of the business service request in the BRID/CLID column on the counterpart processing system, wherein the first business service request is described in a first row of the plurality of rows, wherein the XBR/XOBR column identifies a business service request J in the first row, wherein the BRID/CLID column identifies the business service request J in a second row of the plurality of rows, wherein the ASSBR column identifies business service requests L and M in the second row, wherein the BRID/CLID column identifies the business service requests L and M respectively in a third row and a fourth row of the plurality of rows, wherein the ASSBR column does not identify any business service request in the third row and the fourth row, wherein said performing the compensating actions for said business service request comprises performing the compensating actions for said business service request in accordance with the table which comprises performing the business service requests J, L, and M.

8. A data processing system comprising a computer readable memory unit containing program code configured to be executed by the data processing system to implement a method for managing transactions, said method comprising:
providing at least one resource manager (RM) for managing changes to respective system resources of the data processing system;
providing a resource manager coordinator (RMC) for coordinating commit-backout activities of the at least one resource manager, said resource manager coordinator (RMC) being hosted by the data processing system;
receiving, by the data processing system, a business service request from a remote computer system to perform a task, said task comprising compliant processes complying with a commit/backout protocol and non-compliant processes not complying with a commit/backout protocol, said compliant processes running on the data processing system and said non-compliant processes running on a counterpart processing system that is coupled to the data processing system by a labile link, wherein the commit/backout protocol is characterized for non-compliant processes by compensations implemented in accordance with backout actions performed during execution of the non-compliant processes.

9. The system of claim 8, said method further comprising:
providing at least one extended resource manager (ERM) comprised by the data processing system for managing an execution and compensation of the task, said resource manager coordinator (RMC) being adapted to coordinate compensation services of the at least one extended resource manager (ERM); and
determining by the at least one extended resource manager (ERM), upon receipt of a backout request resulting from the execution of the compliant processes running on the data processing system and the non-compliant processes running on the counterpart processing system, compensation actions to transform the system resources into a mutually consistent state that differs from an initially consistent state of the system resources that existed prior to the execution of the non-compliant processes, wherein changes to the system resources resulting from the execution of the non-compliant processes transform the system resources into a mutually inconsistent state.

10. The system of claim 9, wherein the changes to the system resources resulting from the execution of the non-compliant processes cannot be backed out to transform the system resources from the mutually inconsistent state to the initially consistent state due to the labile link and associated communication problems between the data processing system and the counterpart processing system.

11. The system of claim 9, said method further comprising:
recording information, by an information recording service, concerning the compensation actions performed during the execution of the non-compliant processes; and determining, by the extended resource manager (ERM), the compensation actions on the basis of the information recorded by the information recording service.

12. The system of claim 9, said method further comprising:
backing out the changes to the system resources resulting from execution of the compliant processes before performing the compensation actions, resulting in generation of misaligned logically-correlated data associated with the task;
after completion of said backing out and before performing the compensation actions, rendering the misaligned logically-correlated data public to other tasks; and
performing the compensation actions after said rendering the temporarily misaligned logically-correlated data public to other tasks.

13. The system of claim 8, wherein the data processing system is a front-end server of a banking system, wherein the remote computer system comprises a bank ATM from which the business service request is received by the data processing system, and wherein the counterpart processing system is a server in a banking agency.

14. The system of claim 8, wherein a table comprising a plurality of rows and a plurality of columns describes a plurality of business service requests that includes a business service request A consisting of said business service request, wherein each business service request of the plurality of business service requests is described in a different row of the plurality of rows, wherein a BRID/CLID column of the plurality of columns identifies each business service request of the plurality of business service requests, wherein an ASSBR column of the plurality of columns identifies zero or more business service requests to be serviced while the business service request in the BRID/CLID column is serviced, wherein a XBR/XOBR column of the plurality of columns identifies a business service request of the plurality of business service requests to be executed for performing compensation actions if a backout request results from execution of non-compliant processes of the business service request in the BRID/CLID column on the counterpart processing system, wherein the first business service request is described in a first row of the plurality of rows, wherein the XBR/XOBR column identifies a business service request J in the first row, wherein the BRID/CLID column identifies the business service request J in a second row of the plurality of rows, wherein the ASSBR column identifies business service requests L and M in the second row, wherein the BRID/CLID column identifies the business service requests L and M respectively in a third row and a fourth row of the plurality of rows, wherein the ASSBR column does not identify any business service request in the third row and the fourth row, wherein said performing the compensating actions for said business service request comprises performing the compensating actions for said business service request in accordance with the table which comprises performing the business service requests J, L, and M, by a labile link.

* * * * *